United States Patent [19]
Kashio

[11] 3,957,151
[45] May 18, 1976

[54] CHARACTER PRINTING DEVICE

[75] Inventor: Toshio Kashio, Tokyo, Japan

[73] Assignee: Casio Computer Co., Ltd., Tokyo, Japan

[22] Filed: Mar. 20, 1974

[21] Appl. No.: 452,973

[30] Foreign Application Priority Data

| Mar. 24, 1973 | Japan | 48-33723 |
|---|---|---|
| July 3, 1973 | Japan | 48-74396 |
| July 3, 1973 | Japan | 48-74397 |
| July 3, 1973 | Japan | 48-74398 |
| Aug. 14, 1973 | Japan | 48-90505 |

[52] U.S. Cl.............................. 197/49; 101/93.18
[51] Int. Cl.².............................................. B41J 1/32
[58] Field of Search.............. 197/49, 52, 6.6, 18; 101/93 C; 318/601, 603, 685; 199/59

[56] References Cited
UNITED STATES PATENTS

| 3,227,258 | 1/1966 | Dannier et al. | 197/6.6 |
|---|---|---|---|
| 3,282,389 | 11/1966 | Rvdisch et al. | 197/6.6 |
| 3,291,292 | 12/1966 | Netznik et al. | 199/59 |
| 3,366,214 | 1/1969 | Tvtert et al. | 197/48 |
| 3,374,873 | 3/1968 | Takenaka | 197/49 |
| 3,465,217 | 9/1969 | Kress | 318/18 |
| 3,586,953 | 6/1971 | Markkanen et al. | 318/685 |
| 3,738,471 | 6/1973 | Van Der Werff et al. | 197/52 |

*Primary Examiner*—Ralph T. Rader
*Attorney, Agent, or Firm*—Flynn & Frishauf

[57] ABSTRACT

A printing device employs a printing drum on the peripheral wall of which a plurality of character types are arranged in the axial direction and in the circumferential direction. The axial movement and rotation of the drum are independently controlled by comparing the position of a new character type on the drum to be printed with that of the immediately preceding one of already printed character types thereon at each printing step in response to electric printing information. A hammer is disposed close to the outer periphery of the drum. The hammer advances step by step in printing in the axial direction of the drum independently of the drum to determine the printing position with respect to a record sheet and selectively strikes the opposed surface of the drum through the record sheet. The printing device can thus attain a mechanical driving system for the drum and hammer which has the simplest construction, the least probability of trouble, and a highest possible printing speed with ease.

6 Claims, 44 Drawing Figures

FIG. 2A

~32    ↓11
| I | II | III | IV | V | VI | VII | VIII |
| I | II | III | IV | V | VI | VII | VIII |
| I | II | III | IV | V | VI | VII | VIII |

} 12 COLUMNS

FIG. 2B

~32    ↓11
| I | II | III | IV | V | VI | VII | VIII |
| I | II | III | IV | V | VI | VII | VIII |
| I | II | III | IV | V | VI | VII | VIII |

} 12 COLUMNS

FIG. 3A

~32    ↓11
| I | II | III | IV | V | VI | VII | VIII |
| I | II | III | IV | V | VI | VII | VIII |
| I | II | III | IV | V | VI | VII | VIII |

} 12 COLUMNS

FIG. 3B

~32    ↓11
| I | II | III | IV | V | VI | VII | VIII |
| I | II | III | IV | V | VI | VII | VIII |
| I | II | III | IV | V | VI | VII | VIII |

} 12 COLUMNS

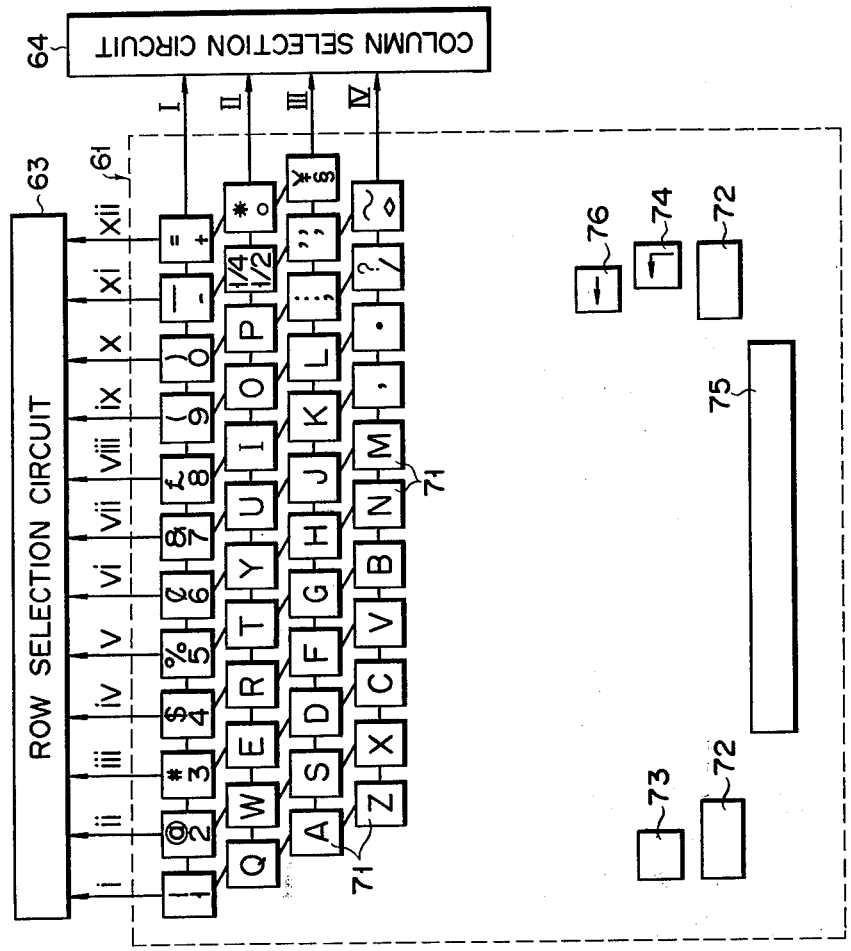
F I G. 6

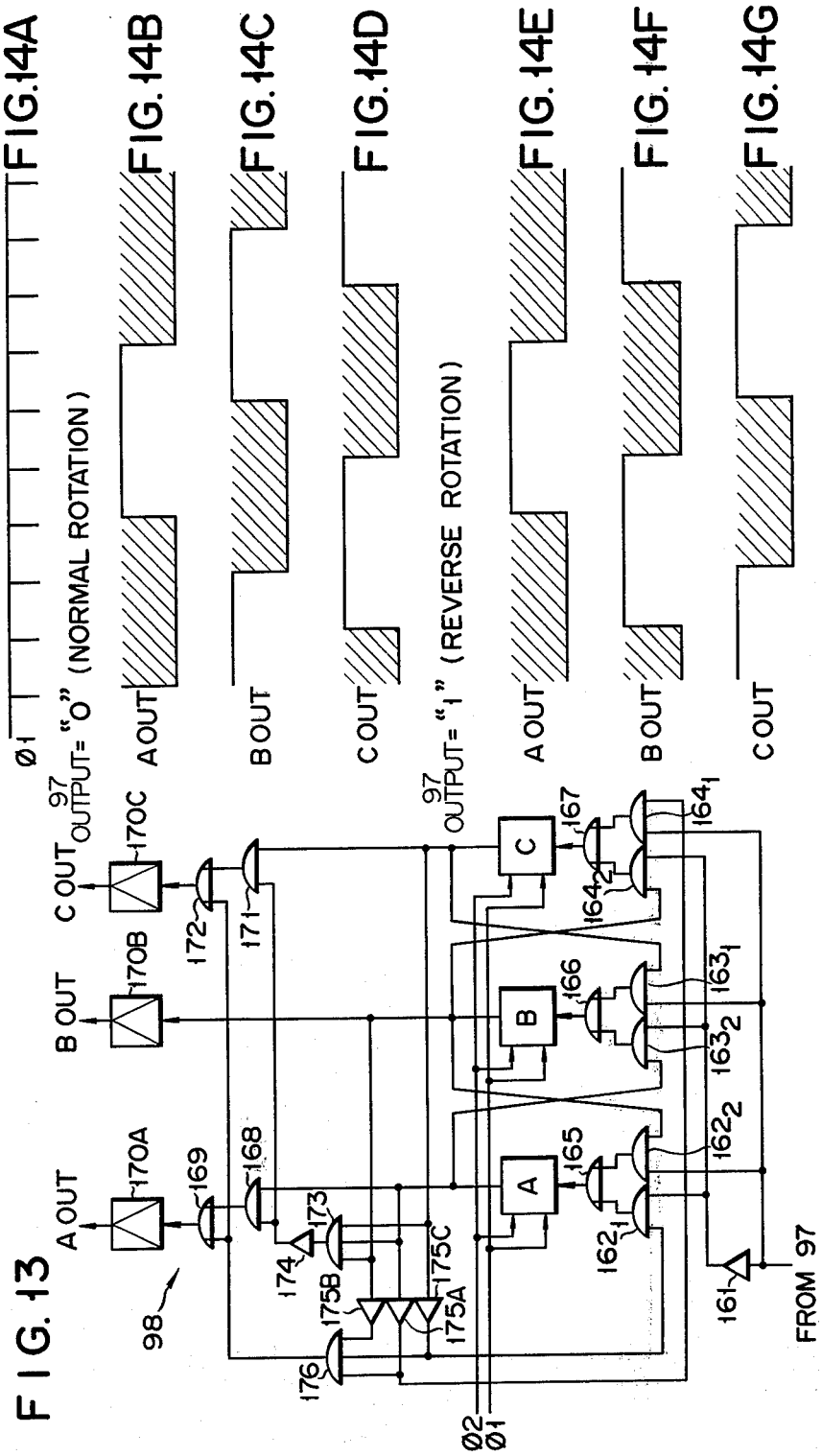

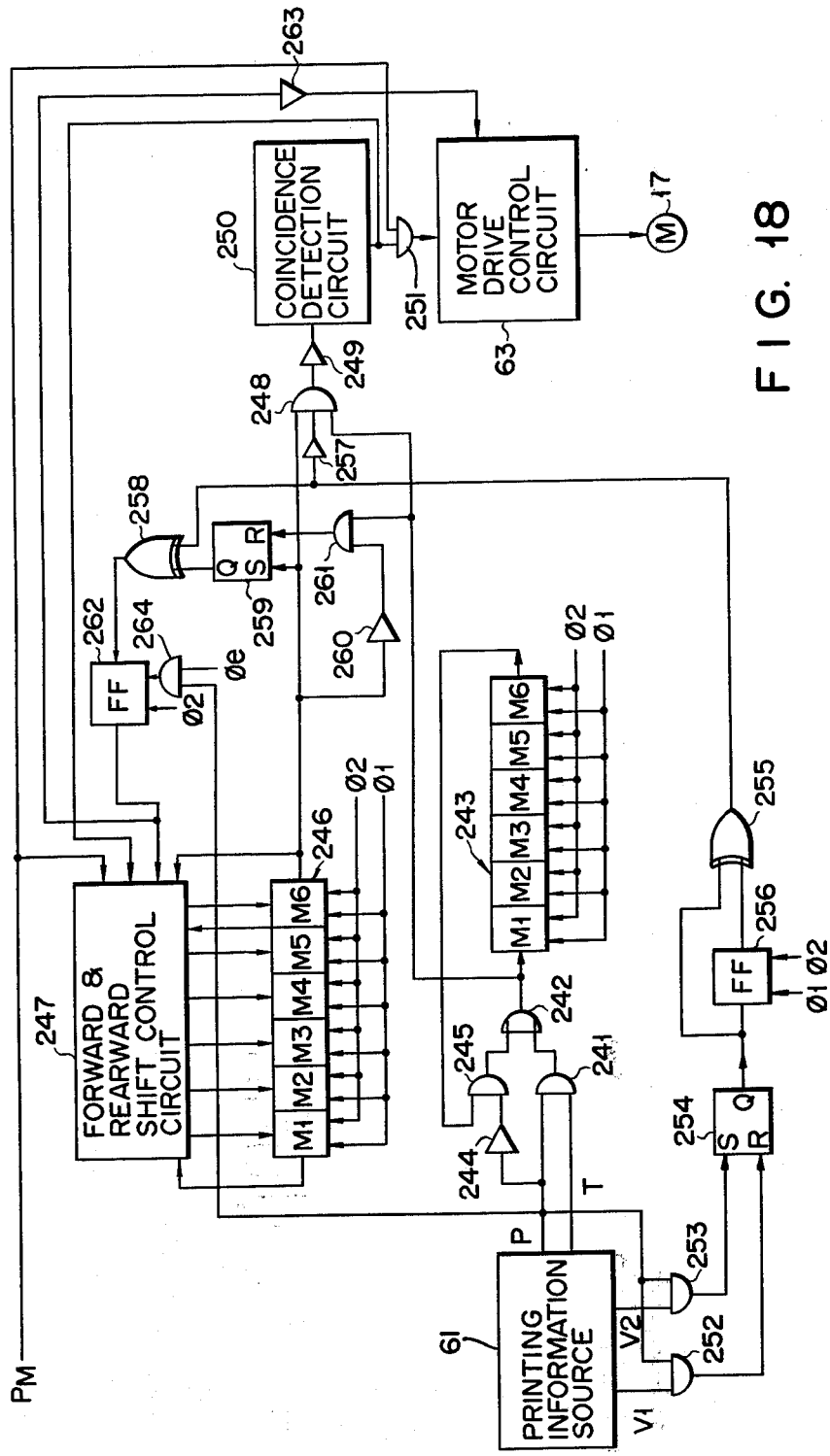
F I G. 18

FIG. 20
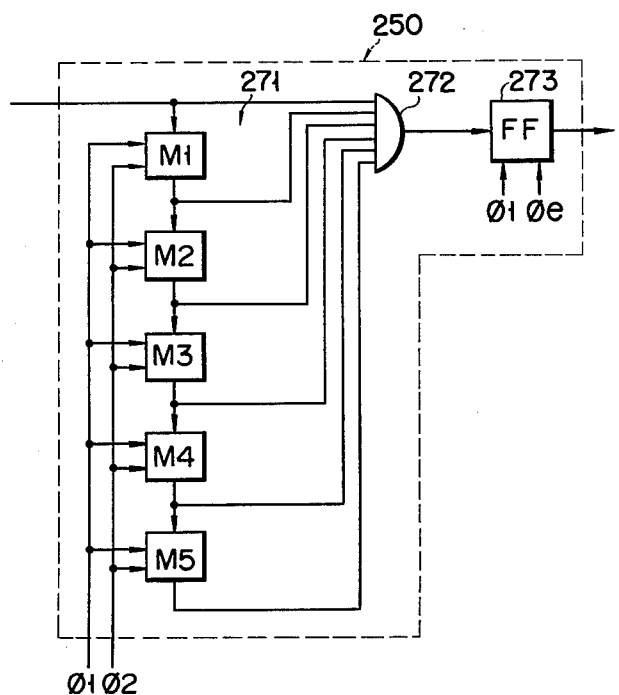
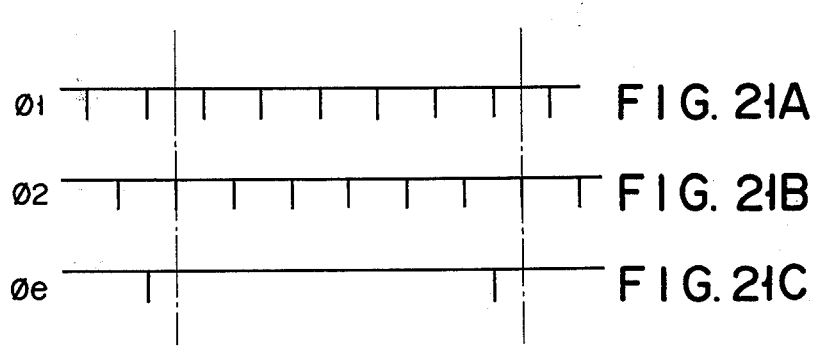
FIG. 21A
FIG. 21B
FIG. 21C

CHARACTER PRINTING DEVICE

This invention relates to a character printing device and more particularly to an improved character printing device wherein any character type arranged on a punting drum is printed on a record sheet in accordance with electric printing information by a hammer disposed close to the drum and moved at each printing step in the axial direction thereof, a plurality of character types being arranged on the peripheral wall of the drum in the axial direction (row) thereof and in the circumferential direction (column), and the drum being moved in the axial direction and rotated around the axis thereof. Character printing devices heretofore put to practical use generally were so constructed as to select those of the plural row and column positions which include a character type on the drum to be opposed to the hammer by moving the drum in accordance with printing information at each printing step as hereinunder described. The drum is first moved in the axial direction in synchronism with the hammer at each printing step by a common drive mechanism to the drum and hammer in order to simplify the mechanical selection of that row position on the drum which includes a character type to be opposed to the hammer, and then further moved in the axial direction of the drum and/or rotated around the axis thereof in accordance with the printing information independently of the hammer.

However, the character printing device thus arranged has the drawback that not only the mechanical drive system for the drum and hammer, particularly the construction of the drive mechanism for the drum interlocking with the hammer at each printing step becomes considerably complicated, but also it is difficult to increase the printing speed beyond a certain limit because, after controlled in movement by said drive mechanism, the drum further requires the axial movement and/or rotation in accordance with the input printing information.

The present inventor has found from various experiments that the row position as well as the column position on the drum including a character type being opposed to the hammer can be easily determined by appropriately controlling an electrical signal being applied to the drive mechanisms of the drum and hammer at each printing step, even when the drive mechanism of the drum was driven separately from that of the hammer, without axially moving the drum in advance together with the hammer by the common drive mechanism to the drum and hammer as observed in the prior art ahead of the axial movement and rotation of the drum.

Accordingly, the object of this invention is to provide a character printing device capable of printing any of plural character type arranged on a printing drum at a relatively high speed by a comparatively simple mechanism.

Note that among the conventional character printing devices includes the one wherein the drum arranged as described above is designed concurrently to serve as a hammer. However, the character printing device of this type has the drawback that the drive mechanism for the drum not only becomes further complicated but also tends frequently to cause troubles.

SUMMARY OF THE INVENTION

A character printing device according to this invention is characterized in that a mechanism for driving a printing drum in the axial direction thereof, a mechanism for rotating the drum around the axis thereof, a mechanism for advancing step by step a hammer provided close to the peripheral wall of the drum, and a mechanism for causing the hammer to strike the opposed outer periphery of the drum through a record sheet, all these mechanisms are independently controlled in accordance with input electric printing signals at each printing step, said drum being provided with a plurality of character types on the peripheral wall in the axial and circumferential directions of the drum.

The printing device thus constructed has the advantage of printing at a highest possible speed by a very simple mechanical driving system with the least probability of causing troubles.

BRIEF DESCRIPTION OF THE DRAWINGS

This invention can be more fully understood from the following detailed description when taken in conjunction with the accompanying drawings, in which:

FIGS. 2A and 2B show schematic representations for better understanding of the correlations between the step-by-step movement of the hammer and the axial movement of the drum shown in FIG. 1;

FIGS. 3A and 3B show schematic representations for better understanding of the correlations between the step-by-step movement of the hammer and the axial movement of the drum where the spacings between respective adjacent character types arranged on the drum are twice those of FIGS. 2A and 2B;

FIG. 6 shows a schematic representation of the key arrangement of an ordinary electronic English language typewritter usable as the printing information source shown in FIG. 5;

FIG. 13 illustrates a practical arrangement of the motor drive control circuit shown in FIG. 9;

FIG. 14A shows first clock pulses used in the circuit of FIG. 13;

FIGS. 14B to 14G are output waveforms derived from respective amplifiers of FIG. 13;

FIG. 18 is a schematic logic circuit diagram of an electronic control circuit in accordance with this invention for rotating the pulse motor 41 shown in FIG. 1;

FIG. 20 is a practical arrangement of the coincidence detection circuit shown in FIG. 18; and FIGS. 21A to 21C show time correlations between three clock pulses used in FIG. 20.

DETAILED DESCRIPTION OF ILLUSTRATED EMBODIMENTS

The preferred embodiments of a character printing device according to this invention will now be described with reference to the accompanying drawings.

Figure 1:
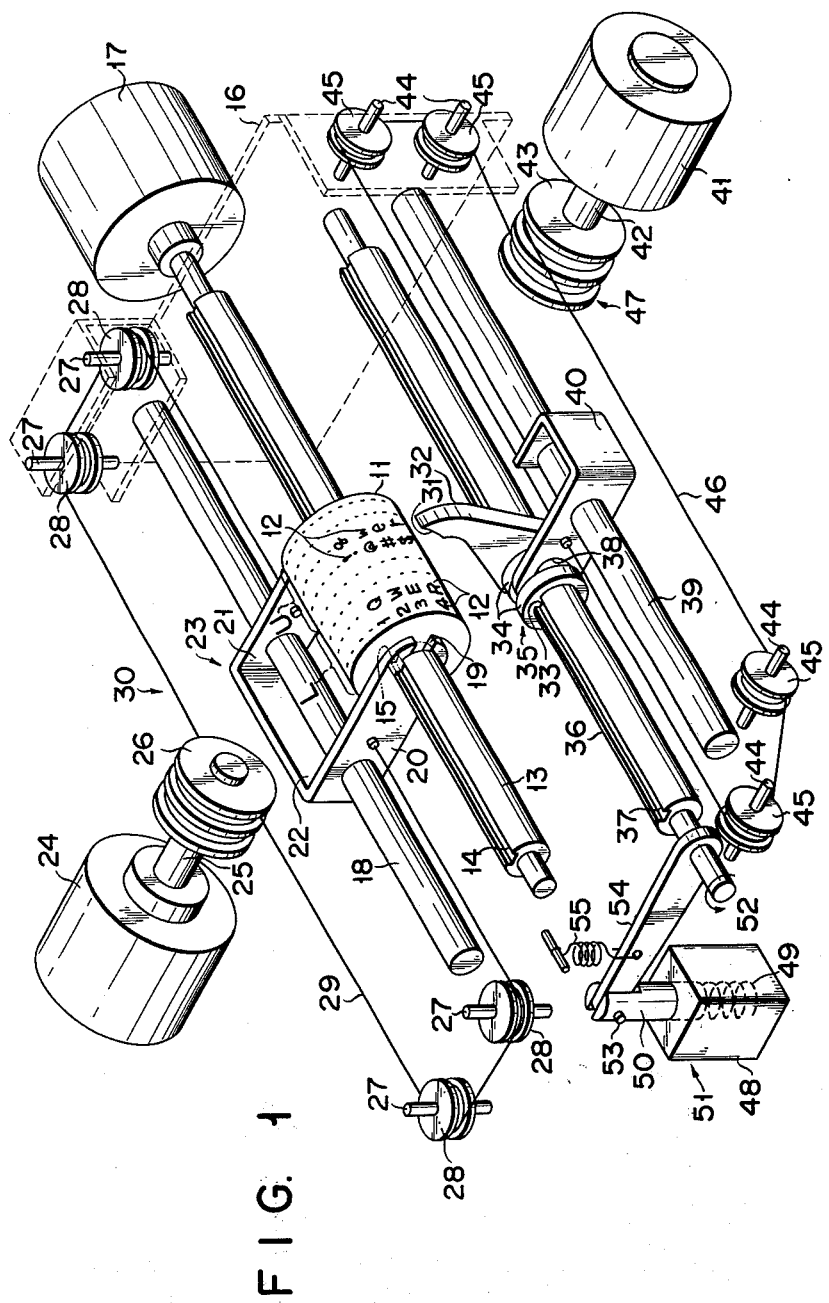
FIG. 1 is a perspective view schematically showing the construction of a character printing device according to this invention.

FIG. 1 is a perspective view schematically showing the construction of a character printing device according to this invention. In FIG. 1, reference numeral 11 denotes a cylindrical printing drum along the peripheral wall of which a plurality of, for example 96 (12 rows × 8 columns), character types 12 are embossed in the axial direction (row) of the drum and in the circumferential direction (column) thereof in accordance with a predetermined pattern.

These character types 12 include those representative of, for example, all the letters of the alphabet, all the digits, and other special characters such as used for the ordinary English language typewriter keyboard.

The printing drum 11 is slidably mounted on an elongated shaft 13 as hereinunder described.

The shaft 13 is provided with a guide groove 14 extending lengthwise thereof and the inner wall of the printing drum 11 has a beltlike projection 15 (shown by a dotted line) slidably engaged with the guide groove 14 of the shaft 13. The shaft 13 is attached to a step or pulse motor 17 at one end portion extending through a support frame 16 (shown by a dotted line). The other end portion of the shaft 13 is rotatably supported to another support frame (not shown) similar to and disposed opposite to the frame 16.

An elongated guide rod 18 is disposed close to, and parallel with, the shaft 13, while both ends are fixed to the opposite support frames 16. Slidably mounted on the guide rod 18 are a pair of arms 20 and 21 of a substantially U-shaped drum support member 23, the pair of arms 20 and 21 being mutually separated at a distance substantially equal to the length of the drum 11 and having the rear ends bridged by a connection member 22. The front ends of said pair of arms 20 and 21 are respectively provided with substantially U-shaped recesses 19 (only one side is shown) slidably engaged with the guide rod 18. The drum support member 23 is movable along the length of the guide rod 18 in any direction by an endless-wire pulley mechanism 30 constructed as hereinunder described, thereby allowing the printing drum 11 to move along the length of the shaft 13 together with the drum support member 23.

The endless-wire pulley mechanism 30 comprises a pulley 26 attached to the rotating shaft 25 of a pulse motor 24, a plurality (4 in this embodiment) of rollers 28 fitted to the corresponding shafts 27, each of which has both ends rotatably supported by the support frame 16, and an endless wire 29 wound around the pulley 26 and fixed at the ends to the pair of the arms 20 and 21 of the drum support member 23 after passing through the respective rollers 28.

On the other hand, a hammer 32 is disposed close to the drum 11 in a manner to permit its tip 31 to face any of the plural character types 12 arranged on the drum 11.

The base of the hammer 32 is fixed attached to one side wall of a support ring 35 of substantially H-shaped in cross section. The support ring 35 has a beltlike projection 33 on the inner wall and a pair of larger diameter collars 34 at both ends.

The projection 33 of the support ring 33 is slidably engaged with a lengthwise extending guide groove 35 of the shaft 36.

The shaft 36 is disposed in parallel with the shaft 13 and has both ends rotatably supported to the opposite support frames 16.

An elongated guide rod 39 is provided close to, and in parallel with, the shaft 36, while both ends are fixed to the opposite support frames 16. Slidably supported to the guide rod 39 are a pair of arms of a substantially L-shaped hammer support member 40 having substantially the same construction as the drum support member 23.

The front end of the long side arm of the hammer support member 40 is provided with a U-shaped recess 38 engaged with the outer wall of the central smaller diameter section of the support ring 35.

The hammer support member 40 is movable along the length of the guide rod 39 in any direction by an endless-wire pulley mechanism 47 having substantially the same arrangement as the pulley mechanism 30 for the drum 11, whereby the hammer 32 is movable along the length of the shaft 36 together with the hammer support member 40. The endless-wire pulley mechanism 47 comprises a pulley 43 attached to the rotating shaft 42 of a pulse motor 41, four rollers 45 fitted to the corresponding shafts 44, each of which has both ends rotatably supported by the support frame 16, and an endless-wire 46 wound around the pulley 43 and fixed at the ends to the hammer support member 40 after passing through the rollers 45. An electromagnetic plunger 51 is provided which comprises an excitation coil 49 (shown by a dotted line) and an actuator rod 50. The coil 49 is mounted within a box 48. The rod 50 has its upper end portion projected outwardly from the box 48.

A lever 54 is rotatably pivoted at one end to the upper end portion of the rod 50 in the plunger 51 through a pin 53. The other end of the lever 54 is rotatably pivoted to the shaft 36. A spiral spring 55 with one end fixed to the frame 16 has the other end attached to substantially the center of the length of the lever 54.

At the deenergization of the coil 49 in the plunger 51, the rod 50 is kept in the indicated position due to the tensile force of the spring 55 and in consequence the hammer 32 remains unrotated in the indicated position. When, however, the coil 49 is energized, the actuator rod 50 of the plunger 51 will be pulled down by a predetermined stroke against the action of the spring 55, whereby the hammer 32, together with the shaft 36, will be rotated by a predetermined angle through the lever 54 in the direction shown by an arrow 52. As a result, the hammer 32 will strike with its tip 31 on the predetermined peripheral wall portion of the drum 11 through inked ribbon and, for example, record sheet.

According to the character printing device of FIG. 1, the drum 11 can be shifted at each printing step by a given stroke along the shaft 16 in any direction and rotated therearound by a given angle in any direction by independently rotating the pulse motors 17 and 24 in a given direction by a given angle in accordance with the input printing information (including return information corresponding to a line shifting operation on the record sheet).

On the other hand, the hammer 32 can be moved at each printing step along the shaft 36 by a predetermined stroke in any direction by rotating the pulse motor 41 in any direction by a given angle in accordance with input printing information (including the ordinary step-by-step shifting information, the aforesaid return information, nonshift information corresponding to the bar-printing operation above or under a character printed on a record sheet, and space information corresponding to two or more step shift operation). Further, the hammer 32 can strike the opposed wall portion of the drum 11 by the selective energization of the plunger 51. It is, therefore, easy to select at each printing step the position of that of a plurality of character types 12 arranged on the drum 11 as described above which faces the hammer 32 in accordance with the input printing information successively supplied from various computers or memory devices, and consequently can print on a record sheet any of the character types arranged on the drum 11 in the desired order.

The practical control over the axial movement of the drum 11 according to the step-by-step advance of the hammer 32 at each printing step will now be described.

Assume now that the hammer 32 is opposed, as shown in FIG. 2A, to a given character type included in those of character types 12 arranged on the drum 11 in the matrix form of 12 rows extending in the axial direction of the drum thereof by 8 columns extending in the circumferential direction thereof, which constitute the first row I. When a character type being printed on a record sheet is contained in the first row I, no axial shift of the drum 11 occurs. If, however, this character type is contained in other rows II to VIII, then the drum 11 will be shifted to the left (in FIG. 2A) in its axial direction by one to seven steps, respectively.

After printing on the record sheet a character type included, for example, in the first row I, the next printing position will take the position, as shown in FIG. 2B, which is defined by one step shift of the hammer 32 to the right.

In this case, the axial shift of the drum 11 will be determined with reference to that of said 12 rows on the drum 11 which includes a character type opposed to the hammer 32.

For example, when the last one of the already printed character types is contained in the first row I on the drum 11 and a new character type being printed is contained in the third row III on the drum, then the drum 11 is required only to shift by one step to the left because the hammer 32 has been shifted by one step to the right.

Note that no problems arise when the respective character types on the drum 11 are formed within the corresponding frames with smaller dimensions than prescribed. If, however, the respective character types on the drum 11 are formed beyond the limited dimensions, then parts of the character types disposed adjacent to a character type being printed tend to be erroneously printed on the record sheet simultaneously with the desired character type.

In this case, it is preferred that the respective character types 12 on the drum 11 are arranged with wider spacings, for example, twice the unit shift distance of the hammer 32 as shown in FIGS. 3A and 3B.

The latter process (FIGS. 3A and 3B) is necessary to use at each printing step a different shift distance in the axial direction of the drum 11 from the former process (FIG. 2A and 2B), as apparent from a comparison between FIGS. 2A–2B and FIGS. 3A–3B and as hereinafter described. However, the unit rotation step of the drum 11 may determine independently of the step-by-step movement of the hammer 32. When, therefore, the character types 12 on the drum 11 are arranged in accordance with the latter case, then it will be apparent that a similar character printing operation to the former case can be attained only by selecting the unit rotation step of the drum 11 twice that of the former case.

In this connection, the ordinary English language typewriter is designed to have a plurality of character type keys arranged on a keyboard in the matrix form of 4 rows by 12 columns and enable to selectively print on a record sheet any of two kinds of character types from each key according to the upper or lower operation of a shift key. For convenience of explanation, but not exclusively limited, it is assumed that the respective character types 12 on the drum 11 are divided according to the array of the character keys of the English language typewriter into two groups, for example, the right half group U and the left half group L in the axial direction of the drum 11 as hereinunder described. The right half group U comprises 48 character types (4 rows and 12 columns), corresponding to those selected upon the upper operation of the shift key of the English language typewriter, while the left half group L comprises 48 character types (4 rows and 12 columns) corresponding to those selected upon the lower operation of the shift key. These character types 12 arranged on the drum 11 with the same array pattern as that of the typewriter.

In such an array of character types 12 on the drum 11, the following input printing instructions are required to drive the pulse motors 17, 24 and 41 and to excite the coil 49 of the electromagnetic plunger 51 (see FIG. 1). The input printing instructions necessary to drive the motor 24 for selecting any character type column on the drum 11 being opposed to the hammer 32 at each printing step are four kinds of signals I to IV for selecting any of the first to fourth columns or the fifth to eight columns signals U and L for selecting one of the aforesaid two groups, a return signal R for returning the drum 11 to the initial or original position for each line shifting operation on a record sheet, and a space signal S corresponding to the space operation on the record sheet. The input printing instructions required to drive the pulse motor 17 for choosing any character type on the drum 11 being opposed to the hammer 32 at each printing step are first to twelfth row selecting signals i to xii and the return signal R, etc. The input printing instructions necessary to drive the motor 41 for moving the hammer 32 along the shaft 36 are a signal for advancing the hammer 32 step-by-step at each printing step, the space signal S, and the return signal R. The input printing instructions being impressed upon the coil 49 of the plunger 51 for striking that of the plural character types 12 arranged on the drum which is opposed to the tip 31 of the hammer 32 through a record sheet is a printing instruction signal P.

Figure 4:
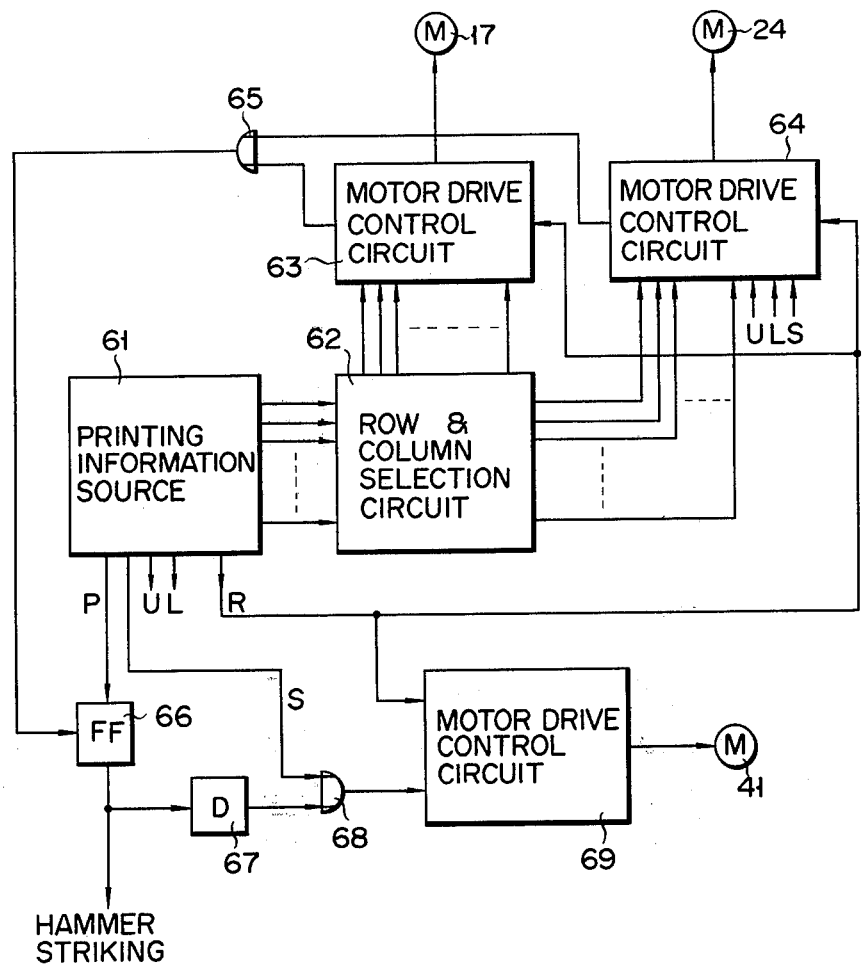
FIG. 4 shows a schematic block diagram of an electronic control circuit for printing any of character types arranged on a printing drum on a record sheet by the printing device of FIG. 1 in accordance with input printing informaton.

FIG. 4 shows a block diagram of an electronic control circuit for printing on a record sheet any of character types arranged as mentioned above on the drum 11 under control of the aforesaid various input printing signals by the printing device of FIG. 1. In FIG. 4, reference numeral 61 designates a printing information source, such as a computer, various memory devices, or electronic English-language typewriter for generating selectively the aforesaid various input printing signals at each printing step above. Row and column selection signals for selecting any character type row and any character type column on the drum 11 from the source 61 are fed to a row and column selection circuit 62. The circuit 62 includes a memory device for storing a signal representative of those of said 12 rows and 8 columns on the drum 11 which contain the last one of the printed character types. A comparison is made at each printing step as hereinafter described between the signal stored in the memory device and the signal supplied from the source 61 which represents a row and column on the drum 11 containing a new character type being printed, thereby generating row and column selection signals to determine the rotating directions and angular displacements of the motors 17 and 24, respectively. The row selection signal obtained from the row and column selection circuit 62 is supplied to a motor drive control circuit 63 to determine the rotating direction and angular displacement of the motor 17. The column selection signal from the row and column selection circuit 62 is fed to a motor drive control circuit 64 to determine the rotating direction and angular displacement of the motor 24. Whenever the row and column selection signals are impresed from the row and column selection circuit 62, the motor drive control circuits 63 and 64 generate their respective output signals which are supplied to an OR gate 65. An output signal from the OR gate 65 thus obtained after the selection of a desired row and column on the drum 11 including a character type being printed is applied as a readout signal to a D-type flip-flop circuit 66 which previously stores the aforesaid printing instruction signal P from the printing information source 61 in order to perform a printing operation in accordance with any character type on the drum 11. An output signal from the flip-flop circuit 66 is applied to the exciting coil 49 of the plunger 51 shown in FIG. 1. Consequently, after completing the axial movement and angular displacement of the drum 11 to a position required for a new character type to be printed by means of the motors 17 and 24, the hammer 32 strikes the opposed character type on the drum 11 through a record sheet. The output signal from the flip-flop circuit 66 is also supplied to an input terminal of an OR gate 68 through a delay circuit 67. The OR gate 68 has another input terminal supplied with the aforesaid space signal S from the printing information source 61. The delay time of the delay circuit 67 is determined in accordance with a length of time required for the hammer 32 to strike the opposed character type on the drum 11. The space signal S is generated by the printing information source 61 substantially at the same timing as the generation of the output signal from the delay circuit 67. An output signal from the OR gate 68 is impressed on a motor drive control circuit 69, resulting in the unit step advance of the hammer 32 along the shaft 36 by the pulse motor 41. Each time the printing operation on a record sheet is changed into a new line, the return signal R is generated by the printing information source 61 and supplied to the respective motor drive control circuits 63, 64 and 69, so that the drum 11 and hammer 32 respectively are returned to the initial positions ready for the next printing operation. Further, the aforesaid U, L and S signals generated by the printing information source 61 are supplied to the motor drive control circuit 64, whereby the printing drum 11 is moved in the predetermined direction by the prescribed distance along the shaft 13 so that a new character type column on the drum 11 is opposed to the hammer 32. According to the character printing device constructed as mentioned above, at least the drum 11 is driven separately from the hammer 32 at each printing step.

Additionally, the axial movement of the drum 11 by the pulse motor 24 is controlled independently of the rotation of the drum 11 around the shaft 13 by the pulse motor 17. Also, the movement of the hammer 32 along the shaft 36 by the pulse motor 41 is controlled separately from striking with the tip 31 of the hammer 32 the opposed character type on the drum 11 by the electromagnetic plunger 51.

Accordingly, the character printing device of this invention has an advantage capable of effecting printing at a highest possible speed with very few troubles by means of considerably simple mechanical drive system of the drum 11 and hammer 32.

In this connection, the high speed printing device ranging between 13 and 25 characters per second has already been developed by the present inventor in accordance with the mechanical drive system of FIG. 1.

Figure 5:
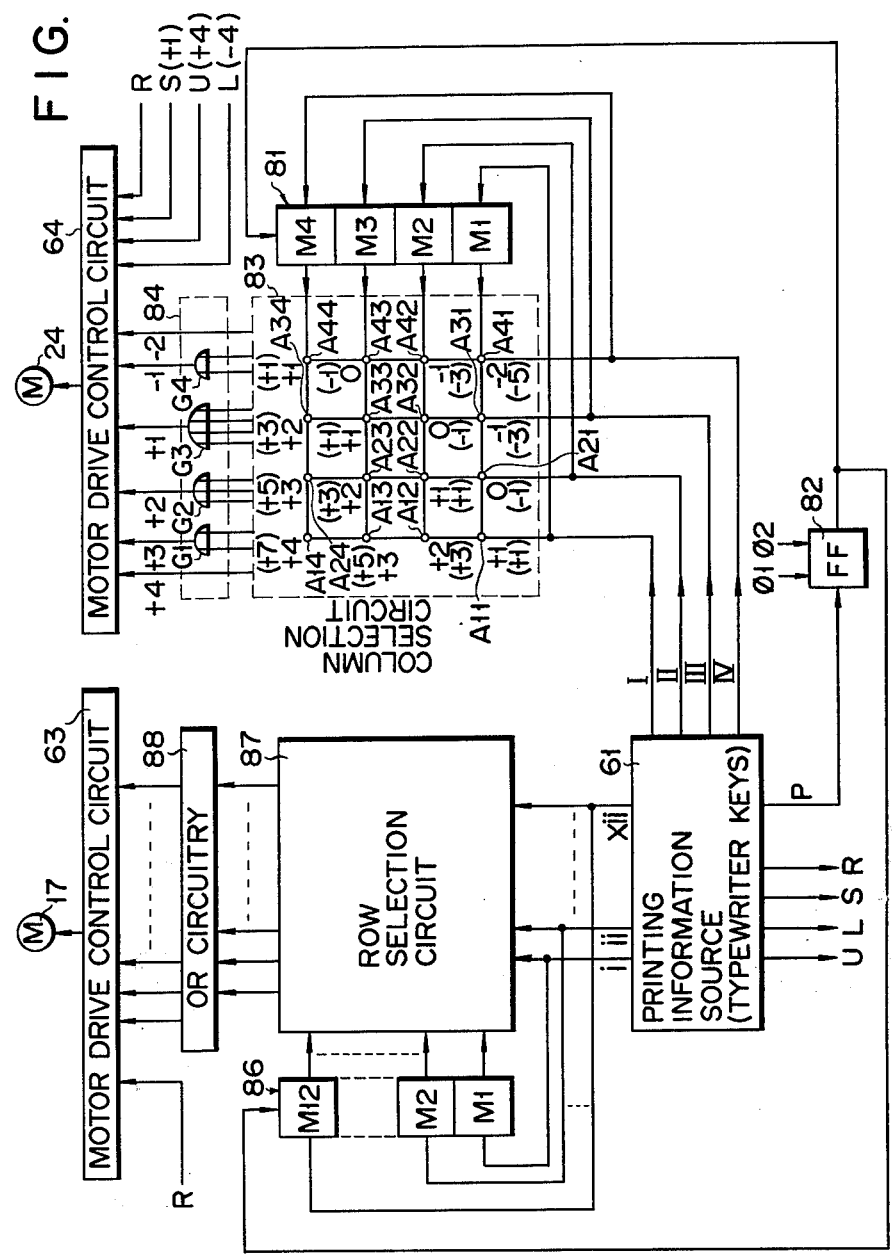
FIG. 5 illustrates a further detailed construction of the row column selection circuit shown in FIG. 4.

FIG. 5 shows a more detailed construction of the row and column selection circuit 62 where the printing information source 61 shown in FIG. 4 comprises an ordinary electronic English-language typewriter.

The ordinary electronic English-language typewriter generally has a plurality of character keys 71 arranged in 4 rows and 12 columns and including 26 letters of the alphabet, numerals 0 to 9, and other special symbols as shown in FIG. 6. Each of the character keys 71 is constructed to enable to print any of two character types in accordance with the selective operation of a shift key 72 and a shift lock key 73. Other keys, such as a return key 74, and a space bar 75, and a space key 76 are also mounted on the keyboard of the typewriter.

When the printing information source 61 of FIG. 4 is constructed by the typewriter keyboard of FIG. 6, then a code converter is not required and an electronic control circuit for the printing device can be constructed with a very simple system by making the array of the character types 12 on the drum 11 identical to that of the character keys 71 of the typewriter. If the character types 12 on the drum 11 are arranged as described above, the input printing signals generated by the selective operation of the respective character keys 71 on the typewriter keyboard can be distinguished by four kinds of column selection signals I to IV and 12 kinds of row selection signals i to xii as shown in FIG. 5. The column selection signal I, II, III or IV obtained thus from the printing information source 61 and representing a column containing a new character type on the drum 11 being printed is supplied to a memory device 81 comprising four memory elements $M_1$ to $M_4$, such as D-type flip-flops, for storing a column selection signal which represents the last one of the printed character types on the drum 11.

The column selection signal stored in the memory device 81 is read out under control of an output signal from D-type flip-flop circuit 82 which stores therein and reads out therefrom the printing instruction signal P (see FIG. 10C) under control of first and second phase clock pulses $\phi_1$ and $\phi_2$ (see FIGS. 10A and 10B).

Figure 7:
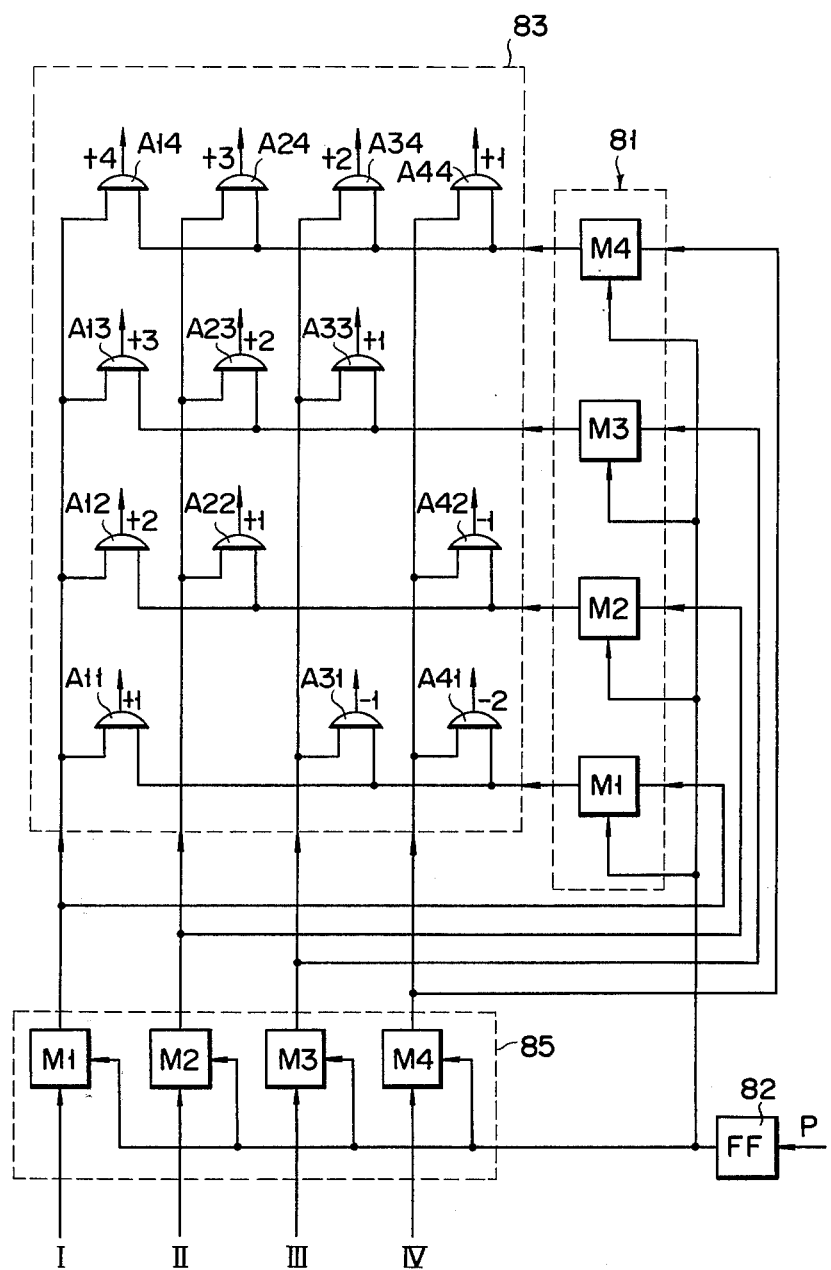
FIG. 7 illustrates a practical arrangement of the column selection circuit shown in FIG. 6.

An output signal from the memory device 81 obtained thus is supplied together with the column selection signal from the printing information source 61 to a column selection circuit 83. The column selection circuit 83 is adapted to generate an output signal for determining the rotating direction and angular displacement of the pulse motor 24 required to shift the drum 11 along the shaft 13 at each printing step by comparing the column selection signal supplied from the printing information source 61 to the column selection circuit 83 with the column selection signal supplied from the memory device 81 to the column selection circuit 83. The column selection circuit 83 comprises, for example, 16 (4×4) AND gates $A_{11}$ to $A_{44}$. These AND gates respectively have two input terminals supplied thereto with different combinations of the first to fourth column selection signals I to IV from the printing information source 61 and the first to fourth column selection signals from the memory device 81, as shown in FIG. 7. With the column selection circuit 83 constructed by the AND gates $A_{11}$ to $A_{44}$, the axial shift of the drum 11 being opposed to the hammer 32 at each printing step can be controlled with accuracy and ease by the output signal of each AND gate. Note that the column-selection signals I to IV supplied from the printing information source 61 to the column selection circuit 83 may also be impressed on the column selection circuit 83 through a memory device 85 having the same construction as the memory device 81 as shown in FIG. 7 without being directly fed to the column selection circuit 83.

For the convenience of ready reference, the distance through which the hammer 32 or the drum 11 is moved along the shaft 13 or 36 in accordance with the input printing signals is defined below. [+1] designates the right unit shift distance of the hammer 32 along the shaft 36 (see FIG. 1) at each printing step and corresponds to the normal rotation of the pulse motor 24, whereas [−1] designates the left unit shift distance and corresponds to the reverse rotation of the pulse motor 24. With a compact array of character types the drum 11 disposed at the same interval as the unit shift distance of the hammer 32 as shown in FIGS. 2A and 2B, the output signals from the AND gates $A_{11}$ to $A_{44}$ can be represented by the numerals as shown in FIGS. 5 and 7 in correspondence with the distance of the axial shift of the drum 11. Note in FIG. 5 that numerals in parenthesis denote the meanings or significance of output signals from the AND gates $A_{11}$ to $A_{44}$ where respective character types on the drum 11 are arranged with spacings twice the unit shift distance of the hammer 32, as indicated in FIGS. 3A and 3B. The outputs from the AND gates $A_{11}$ to $A_{44}$ representing the same significance are applied to a motor drive control circuit 64 through the corresponding OR gates $G_1$, $G_2$, $G_3$ and $G_4$, thereby to control the rotating direction and angular displacement of the pulse motor 24. The drum 11 can thus be shifted along the shaft 13 by the required distance at each printing step.

On the other hand, 12 types of row selection signals i to xii generated by the printing information source 61 are supplied to a row selection circuit 87 of the same construction as the column selection circuit 83, for example, consisting of 12×12 = 144 AND gates (not shown), together with output signals from the memory device 86 of the same construction as the memory device 81, for example, consisting of 12 memory elements $M_1$ to $M_{12}$, such as D-type flip-flops.

The output signals from the row selection circuit 87 are supplied to the motor drive control circuit 63 through the OR circuitry 88 consisting of a plurality of OR gates (not shown) having the same construction as the OR circuit 84 and rotate the motor 17 in the desired direction by the desired angle. A row on the drum 11 containing a character type being opposed to the hammer 32 at each printing step can thus be selected. The return signal R from the printing information source 61 are fed to the motor drive control circuits 63 and 64, respectively, for each new line shifting operation on a record sheet (not shown).

Note that the space signal S and signals U and L from the printing information source 61 are fed as signals having significances [+1], [+4], and [−4] respectively in correspondence with the axial shift of the drum 11 like the output signals of the AND gates with respect to the motor drive control circuit 64.

Figure 8:
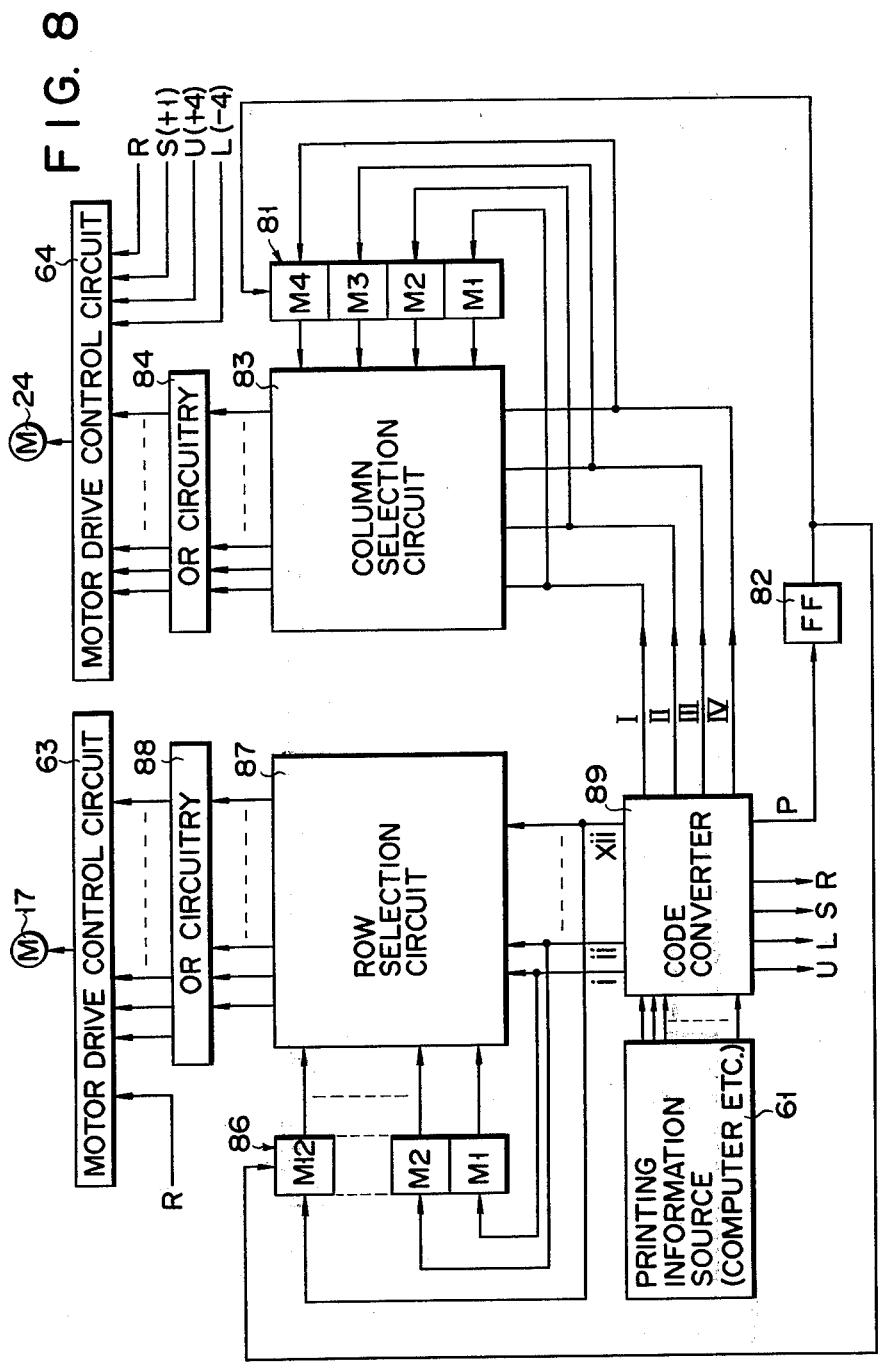
FIG. 8 shows a schematic block circuit diagram modified from FIG. 5.

FIG. 8 is a circuit diagram schematically showing one modification of FIG. 5 using a computer, various memory devices, etc. as the printing information source 61. The operation of the circuit of FIG. 8 is similar to that of FIG. 7, provided input printing signals delivered from the printing information source 61 are merely converted into printing signals in accordance with an array of character type on the drum 11 by a code converter 89. Parts of FIG. 8 corresponding to those of FIG. 7 are denoted by the same symbols and the description thereof is omitted.

Figure 9:
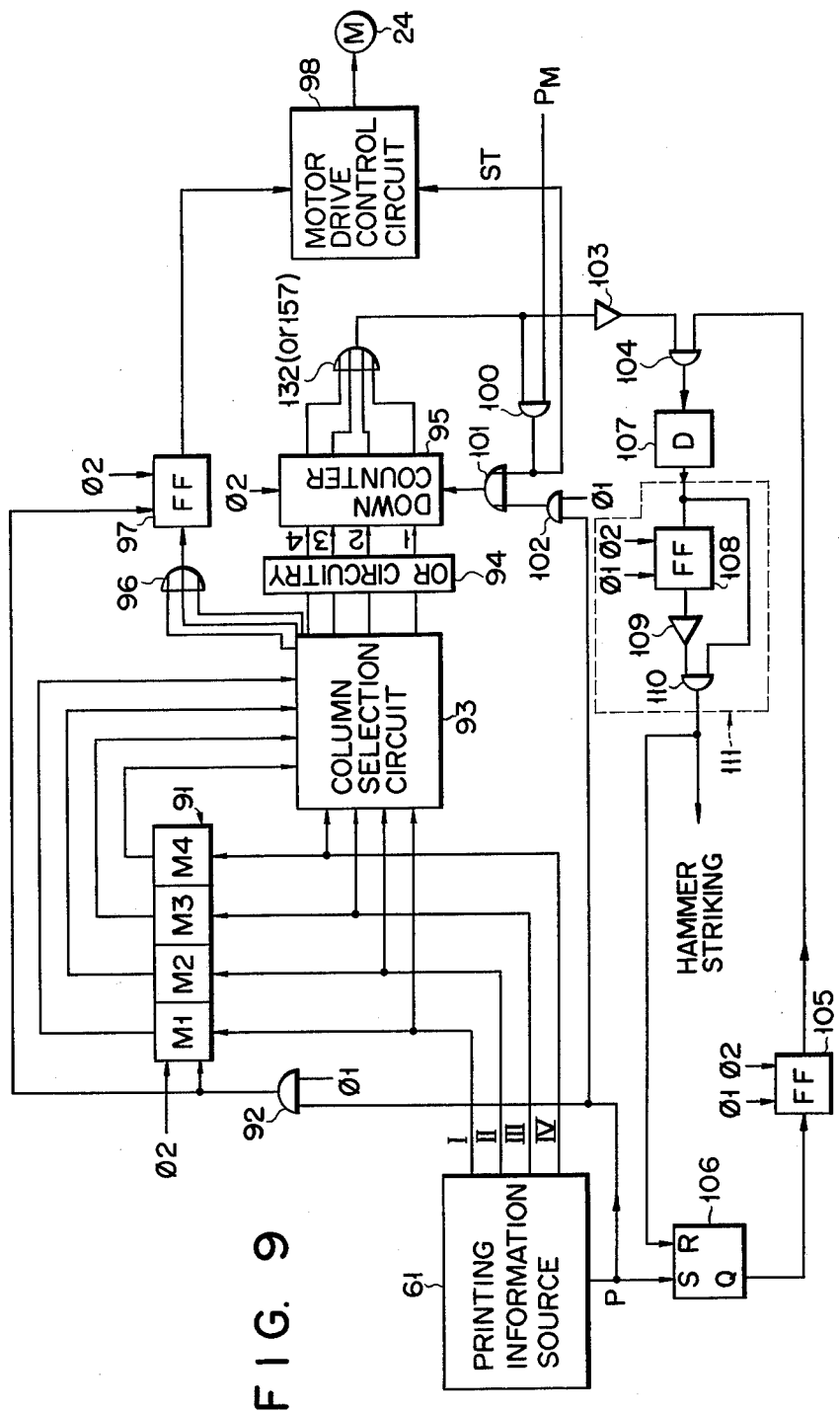
FIG. 9 illustrates a schematic logic circuit diagram of an electronic control circuit for rotating the pulse motor 24 shown in FIG. 1.

FIG. 9 is a block diagram schematically illustrating an electronic control circuit for rotating the pulse motor 24 in accordance with the movement of the hammer 32 shown in FIG. 1.

Four types of column selection signals I to IV from the printing information source 61 are fed to a memory device 91 consisting, for example, of four memory elements $M_1$ to $M_4$, such as D-type flip-flops. The memory device 91 stores the column-selection signals I to IV under control of an output signal of an AND gate 92 to which the printing instruction signal P (see FIG. 10C) from the printing information source 61 and the first phase clock pulse $\phi_1$ as shown in FIG. 10A are supplied. The column selection signal stored in the memory device 91 which represents a column on the drum 11 containing the last one of the printed character types is read out from the memory device 91 under control of the second clock pluse $\phi_2$ as shown in FIG. 10B.

Thus, the readout signal from the memory device 91 is supplied, together with the column selection signal from the printing information source 61 which represents a column on the drum 11 containing a new character type being printed, to a column selection circuit 93 of the same construction as the column selection circuit 83.

As a result, the column selection circuit 93 generates an output for shifting the drum 11 along the shaft 13 by the desired distance. The output signal from the column selection circuit 93 thus obtained is stored in a down (or up) counter 95 through an OR circuitry 94 similar in construction to the OR circuitry 84, under control of the output signal from an OR gate 101 (described below). Note that the OR circuitry 94 differs from the OR circuitry 84 in that each OR circuit included in the circuitry 94 is supplied with signals merely representing the same absolute numerical values, irrespective of the polarity (plus or minus) of the numerical signals fed from the column selection circuit 93. Each of the minus numerical signals from the column selection circuit 93 thus obtained (totaling three from the AND gates $A_{31}$, $A_{41}$ and $A_{42}$, as shown in FIGS. 5 and 7) is stored through an OR gate 96 in a D-type flip-flop circuit 97 under control of the output signal from the AND gate 92. The signal stored in the flip-flop circuit 97 is read out therefrom under control of the second phase clock pulse $\phi_2$ and supplied as a normal or reverse rotating instruction signal to a motor drive control circuit 98.

Figure 11:
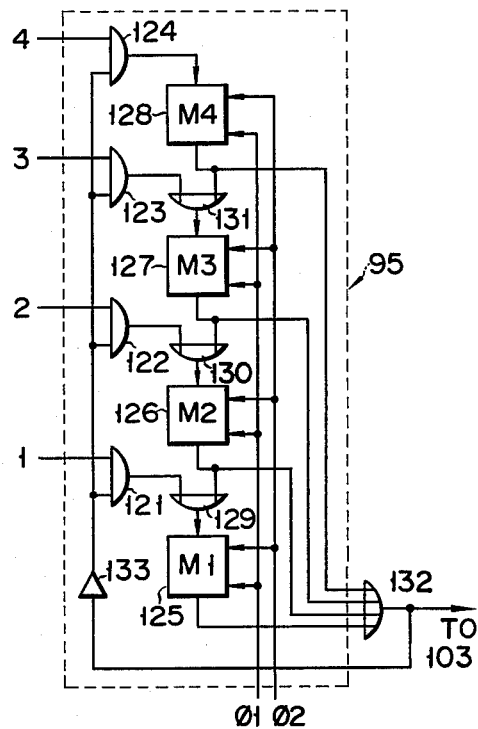
FIG. 11 shows a practical circuit arrangement of the down counter shown in FIG. 9.

FIG. 11 shows a practical circuit arrangement of said down counter 95. The down counter 95 includes four AND gates 121, 122, 123 and 124 each having an input terminal supplied via the OR circuitry 94 with the corresponding one of numerical signals 4, 3, 2 and 1 which represent the step rotation angle of the pulse motor 24. The output signals from the AND gates 121 to 124 are written in the corresponding memory elements 125 to 128 such as D-type flip-flops under control of the first phase clock pulse $\phi_1$ and read out therefrom under control of the second phase clock pulse $\phi_2$. Although only the output signal from the AND gate 124 corresponding to the numerical signal 4 is applied directly to the corresponding memory element 128, the output signals from the remaining AND gates 121 to 123, together with those from the immediately preceding memory elements 126 to 128 are impressed on the corresponding memory elements 125 to 127 through the corresponding OR gates 129, 130 and 131. The outputs from the memory elements 125 to 128 are fed to the other common input terminal of the AND gates 121 to 124 through an OR gate 132 and an inverter 133, respectively.

The operation of the down counter 95 so constructed will now be described. When no numerical signal is supplied from the OR circuitry 94, the outputs from the OR gate 132 and inverter 133 will become a binary coded signal "0" and a binary coded signal "1", respectively. Under these conditions, if any of the numerical signals 1 to 4 is impressed on the down counter 95 from the column selection circuit 93 through the OR circuitry 94, the corresponding one of the AND gates 121 to 124 will be actuated to write its numerical signal in the corresponding one of the memory elements 125 to 128 under control of an output signal from an AND gate 102 as hereinunder described. The numerical signal stored in the memory element will be read out therefrom under control of the second phase clock pulse $\phi_2$ and then written in the immediately succeeding memory element under control of the first phase clock pulse $\phi_1$. This operation is repeated until an output signal is generated from the last-stage memory element 125 thereby to complete the counts of the down counter 95. The output from the inverter 133 will become a binary 1 again, preparing for the next operation.

Figure 12:
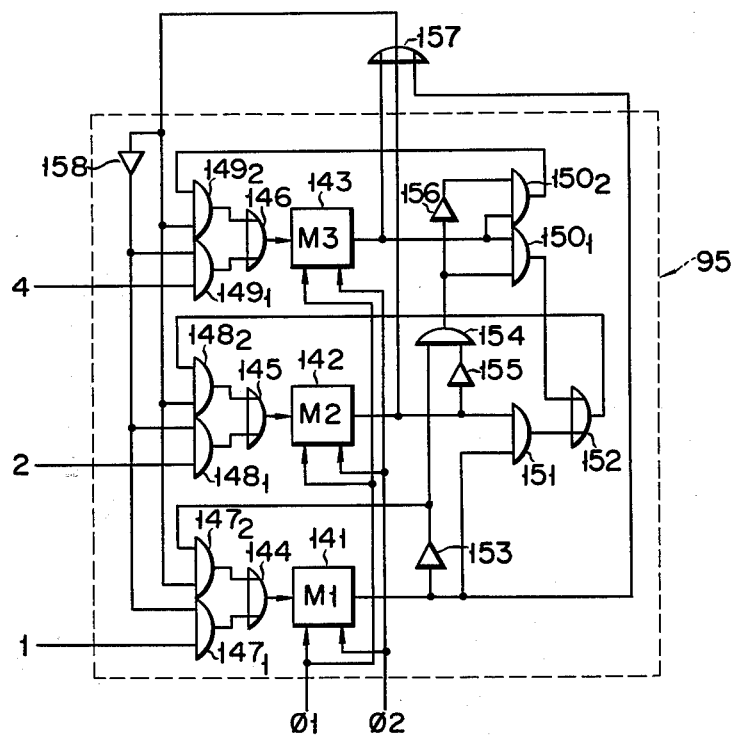
FIG. 12 illustrates another practical circuit arrangement of the down counter shown in FIG. 9.

The down counter 95 may also be constructed of the binary counter as shown in FIG. 12 where the inputs are the numerical signals 4, 2, 1 instead of 4, 3, 2, 1 described above. This binary counter 95 includes three memory elements 141, 142 and 143 such as flip-flips, corresponding to the numerical signals 4, 2, 1. These memory elements 141 to 143 are each coupled with a pair of AND gates $147_1$-$147_2$, $148_1$-$148_2$, and $149_1$-$149_2$ through the corresponding OR gates 144, 145, and 146. The corresponding one of the numerical signals 4, 2 and 1 is impressed on one input terminal of each of the AND gates $147_1$, $148_1$ and $149_1$. The output terminal of the memory element 143 corresponding to the numerical signal 4 is connected to each one input terminal of two AND gates $150_1$ and $150_2$. The output terminal of the AND gates gate $150_1$ is connected to one input terminal of the AND gate $149_2$. The output terminal of the memory element 142 corresponding to the numerical signal 2 is connected to one input terminal of an AND gate 151. The AND gate 151 has the other input terminal connected to the output terminal of memory element 141 corresponding to the numerical signal 1. The output terminals of the AND gates 151 and $150_1$ are connected to two input terminals of an OR gate 152. The output terminal of the OR gate 152 is connected to one input terminal of the AND gate $148_2$. The output terminal of the memory element 141 is also connected to one input terminal of the AND gate $147_2$ through the inverter 153. The output terminal of the memory element 142 is also connected to one input terminal of an AND gate 154 through an inverter 155. The output terminal of the AND gate 154 is connected to the other input terminal of the AND gate $150_1$ and also connected to the other input terminal of the AND gate $150_2$ through an inverter 156. The output terminals of the memory elements 141 to 143 are connected to the input terminals of an OR gate 157 having the same construction as the OR gate 132. The output terminal of the OR gate 157 is connected to the other common input terminal of the AND gates $147_2$, $148_2$ and $149_2$ and also connected to the other common input terminal of the AND gates $147_1$, $148_1$ and $149_1$ through an inverter 158.

Each of the bistable elements 141 to 143 can thus write the numerical signal 4, 2, or 1 (numeral signal 3 can be represented by the digits 2 and 1) applied to its input terminal under control of the first phase clock pulse $\phi_1$. The numerical signal stored in each of the memory elements 141 to 143 is read out therefrom under control of the second clock pulse $\phi_2$.

It is known to those skilled in the art that the binary counter thus constructed can be used like the down counter having the construction of FIG. 11.

Referring again to FIG. 9, the output signal from the OR gate 132 (or 157) is impressed on an AND gate 100 together with a stepping pulse PM having a repetitive period determined by the frequency characteristic of the motor 24. An output signal from the AND gate 100 is applied as a step instruction signal ST to the motor drive control circuit 98 and also to one input terminal of said OR gate 101. The OR gate 101 has the aforesaid other input terminal connected to the output terminal of the AND gate 102 having an input terminal supplied with the printing instruction signal P from the printing information source 61 and another input terminal supplied with the first phase clock pulse $\phi_1$. The output terminal of the OR gate 132 (or 157) is also connected to one input terminal of an AND gate 104 through an inverter 103. The AND gate 104 has the other input terminal connected to the output terminal of a D-type flip-flop circuit 105. The flip-flop circuit 105 is actuated to write therein under control of the first phase clock pulse $\phi_1$ a Q output signal from an R-S flip-flop circuit 106 which is brought to a set position by the printing instruction signal P from the printing information source 61. The printing instruction signal stored in the flip-flop circuit 105 is read out therefrom under control of the second phase clock pulse $\phi_2$ and then impressed on the AND gate 104. An output from the AND gate 104, after the output signal from the OR gate 132 (or 157) becomes binary 0, i.e., the axial movement of the drum 11 is completed, is applied to a one-shot multivibrator 111 through a delay circuit 107. The multivibrator 111 comprises a D-type flip-flop circuit 108, an inverter 109, and an AND gate 110. The flip-flop circuit 108 has the same construction as the flip-flop circuit 105. An output signal from the one-shot multivibrator 111 is applied as a striking instruction signal of the hammer 32 to the coil 49 of the plunger 51.

FIG. 13 shows a practical arrangement of the motor drive control circuit 98 of FIG. 9. The motor drive control circuit 98 includes three memory elements A, B and C, such as D-type flip-flops corresponding to the three-phase winding of the pulse motor 24. To the input terminal of each of the memory elements A, B and C is connected the output terminal of the corresponding OR gate 165, 166 or 167 which has two input terminals connected to the output terminals of a pair of corresponding AND gates $162_1$-$162_2$, $163_1$-$163_2$ or $164_1$-$164_2$. The AND gates $162_2$, $163_1$, and $164_1$ each have one common input terminal connected directly to the output terminal of the flip-flop circuit 97 and the AND gates $162_1$, $163_2$ and $164_2$ each have one common input terminal connected thereto through an inverter 161. The output terminal of the memory element A is connected to the other input terminal of the AND gate $163_2$ and also to one input terminal of an AND gate 168. The output terminal of the AND gate 168 is connected to an input terminal of an OR gate 169. The output terminal of the OR gate 169 is connected to an amplifier 170A provided if required. The output terminal of the memory element B is connected to the other input terminal of each of the AND gates $162_2$ and $164_2$ and also to an amplifier 170B provided if necessary. The output terminal of the memory element C is connected to the other input terminal of the AND gate 163 and also to an amplifier 170C, if necessary, through an AND gate 171 and an OR gate 172 of the same construction as the AND gate 168 and OR gate 169, respectively.

The output terminals of the memory elements A to C are coupled to the other common input terminal of the AND gates 168 and 171 through an OR gate 173 and an inverter 174, and also to the other common input terminal of the OR gates 169 and 172 through corresponding inverters 175A to 175C and an AND gate 176 having three input terminals connected to the respective output terminals of the inverters 175A to 175C. The output terminal of the inverter 175A is also connected to the other input terminal of the AND gate $164_1$. The output terminal of the inverter 175C is further connected to the other input terminal of the AND gate $162_1$. The memory elements A to C operate to store the minus numerical signal (i.e., rotating the pulse motor 41 in the reverse direction) or the plus numerical signal (i.e., rotating the pulse motor 41 in the normal direction) which is supplied from the flip-flop circuit 97 through any of the pair of corresponding AND gates $161_1$-$161_2$ to $164_1$-$164_2$ under control of the first clock pulse $\phi_1$. The stored information in the memory elements A to C is read out therefrom under control of the second phase clock pulse $\phi_2$.

In the motor drive control circuit 98 thus constructed, the memory elements A to C each generate an output signal (see FIGS. 14B to 14G) which periodically encircles every generating period of three first phase clock pulses $\phi_1$. The direction of the encirclement depends upon whether the minus numerical signal or the plus numerical signal is applied from the flip-flop circuit 97 to the memory elements A to C.

Tables I and II show truth tables representing the relationships between the binary coded signals stored in the memory elements A to C and the binary coded signals obtained through the amplifiers 170A to 170C with respect to the normal and reverse rotations of the pulse motor 41.

Table I

| Rotation steps | (Normal rotation) Memory element | | | | | |
|---|---|---|---|---|---|---|
| | A | B | C | Aout | Bout | Cout |
| 0 | 0 | 0 | 0 | 1 | 0 | 1 |
| 1 | 1 | 0 | 0 | 1 | 0 | 0 |
| 2 | 1 | 1 | 0 | 1 | 1 | 0 |
| 3 | 1 | 1 | 1 | 0 | 1 | 0 |
| 4 | 0 | 1 | 1 | 0 | 1 | 1 |
| 5 | 0 | 0 | 1 | 0 | 0 | 1 |
| 6 | 0 | 0 | 0 | 1 | 0 | 1 |

Table II

| Rotation steps | (Reverse rotation) Memory element | | | | | |
|---|---|---|---|---|---|---|
| | A | B | C | Aout | Bout | Cout |
| 0 | 0 | 0 | 0 | 1 | 0 | 1 |
| 1 | 0 | 0 | 1 | 0 | 0 | 1 |
| 2 | 0 | 1 | 1 | 0 | 1 | 1 |
| 3 | 1 | 1 | 1 | 0 | 1 | 0 |
| 4 | 1 | 1 | 1 | 1 | 1 | 0 |
| 5 | 1 | 0 | 0 | 1 | 0 | 0 |
| 6 | 0 | 0 | 0 | 1 | 0 | 1 |

Figure 10:
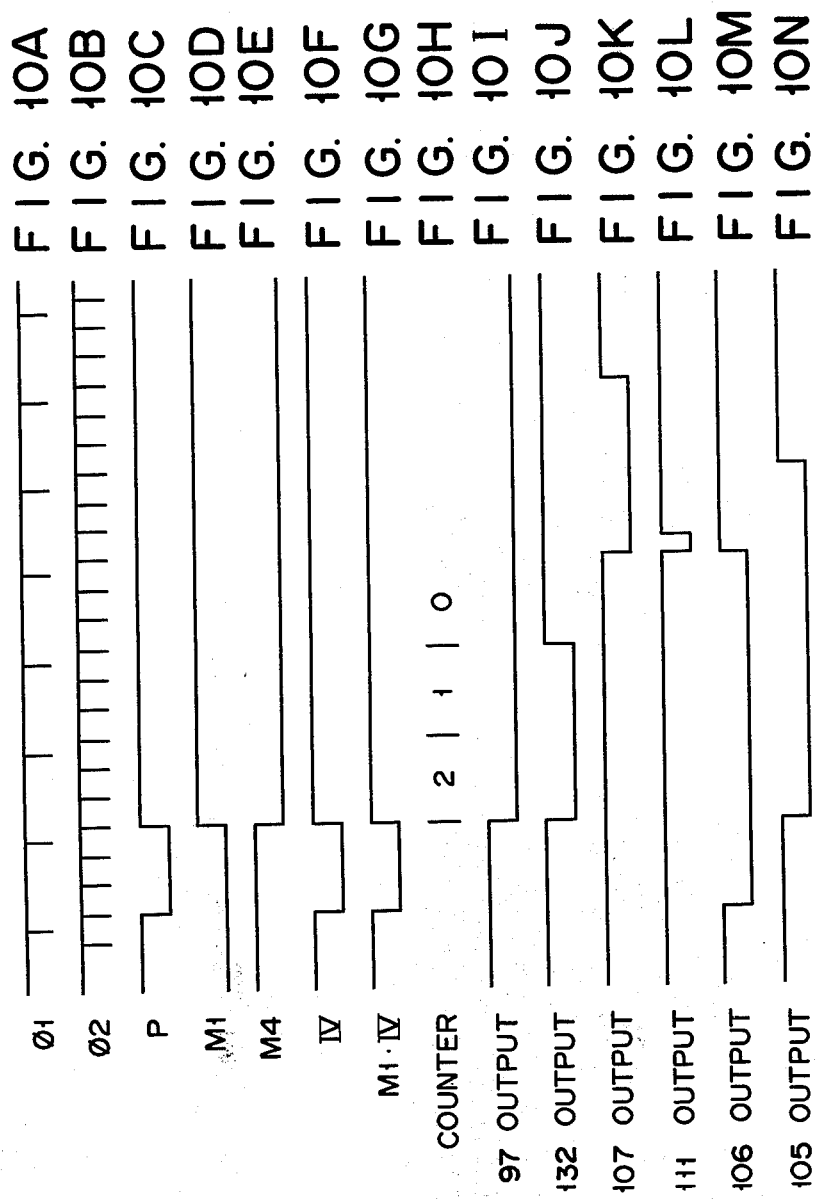
FIGS. 10A to 10N show output waveforms delivered from respective circuit portions of FIG. 9.

Referring now to FIGS. 10A to 10N, the operation of the circuitry of FIG. 10 will be described.

When the last one of the already printed character types on the drum 11 is contained in the first column I thereon, then a column selection signal representing the first column I on the drum 11 is stored in the first memory element $M_1$ of the memory device 91, as shown in Fig. 10D. Under this condition, if a column selection signal IV representing the fourth column on the drum 11 is generated from the printing information source 61 as shown in FIG. 10F, then the numerical signal 2 as shown in FIG. 10G is supplied from the column selection circuit 93 to the down counter 95 through the OR circuitry 94 in synchronism with the printing instruction signal P (see FIG. 10C) from the printing information source 61. The numerical signal 2 is thus stored in the down counter 95 under control of the output signal from the OR gate 101.

The numerical signal 2 from the column selection circuit 93 is a minus one as apparent from FIGS. 5 and 7. This minus numerical signal 2 is written in the flip-flop circuit 97 under control of the output signal from the AND gate 92. The signal stored in the flip-flop circuit 97 is read out therefrom under control of the second phase clock pulse $\phi_2$ (see FIG. 10I) and then fed as a reverse through the motor drive control circuit 98 rotating instruction signal to the pulse motor 41 in accordance with the truth table II. At the same time numerical signal 2 stored in the down counter 95 is counted down as 2, 1, 0 in sequence under control of the first and second phase clock pulses $\phi_1$ and $\phi_2$, as shown in FIG. 10H. A binary coded signal 1 (see FIG. 10J) is generated from the OR gate 132 (or 157) during the numeral stored in the down counter 95 represents 2 or 1. The output signal 1 from the OR gate 132 (or 157) is impressed on the motor drive control circuit 98 as a step instruction signal through the AND gate 100, thereby rotating the pulse motor 41 by two steps in the reverse direction.

If the output signal from the down counter 95 is reduced to zero, the output signal from the OR gate 132 (or 157) will be changed from binary 1 to binary 0 and in consequence the output signal from the inverter 103 is changed from binary 0 to binary 1. At this time, the R-S flip-flop circuit 106 is brought to a set position by the printing instruction signal P from the printing information source 61, as shown in FIG. 10M. The Q output of the flip-flop circuit 106 is stored in the flip-flop circuit 105 under control of the first phase clock pulse $\phi_1$. The printing instruction signal stored in the flip-flop circuit 105 is read out therefrom under control of the second phase clock pulse $\phi_2$ (see FIG. 10N). The output signal from the flip-flop circuit 105 is impressed on the delay circuit 107 through the qualified AND gate 104, delayed by a prescribed length of time (see FIG. 10K) and then applied to the one-shot multivibrator 111. Thus, a pulse signal as shown in FIG. 10L is generated from the multivibrator 111. The output pulse signal from the multivibrator 111 is impressed on the coil 49 of the plunger 51 as the striking instruction signal for the hammer 32 and also on the R-S flip-flop circuit 106 as a reset signal, whereby the flip-flop circuit 106 is made ready for the next character printing operation.

Before the completion of the character printing operation in accordance with the fourth column selection signal IV from the printing information source, the memory position in the memory device 91 is changed from the first memory element $M_1$ to the fourth memory element $M_4$ (see FIG. 10E), whereby the memory device 91 is made ready for the next character printing operation.

Figure 15:
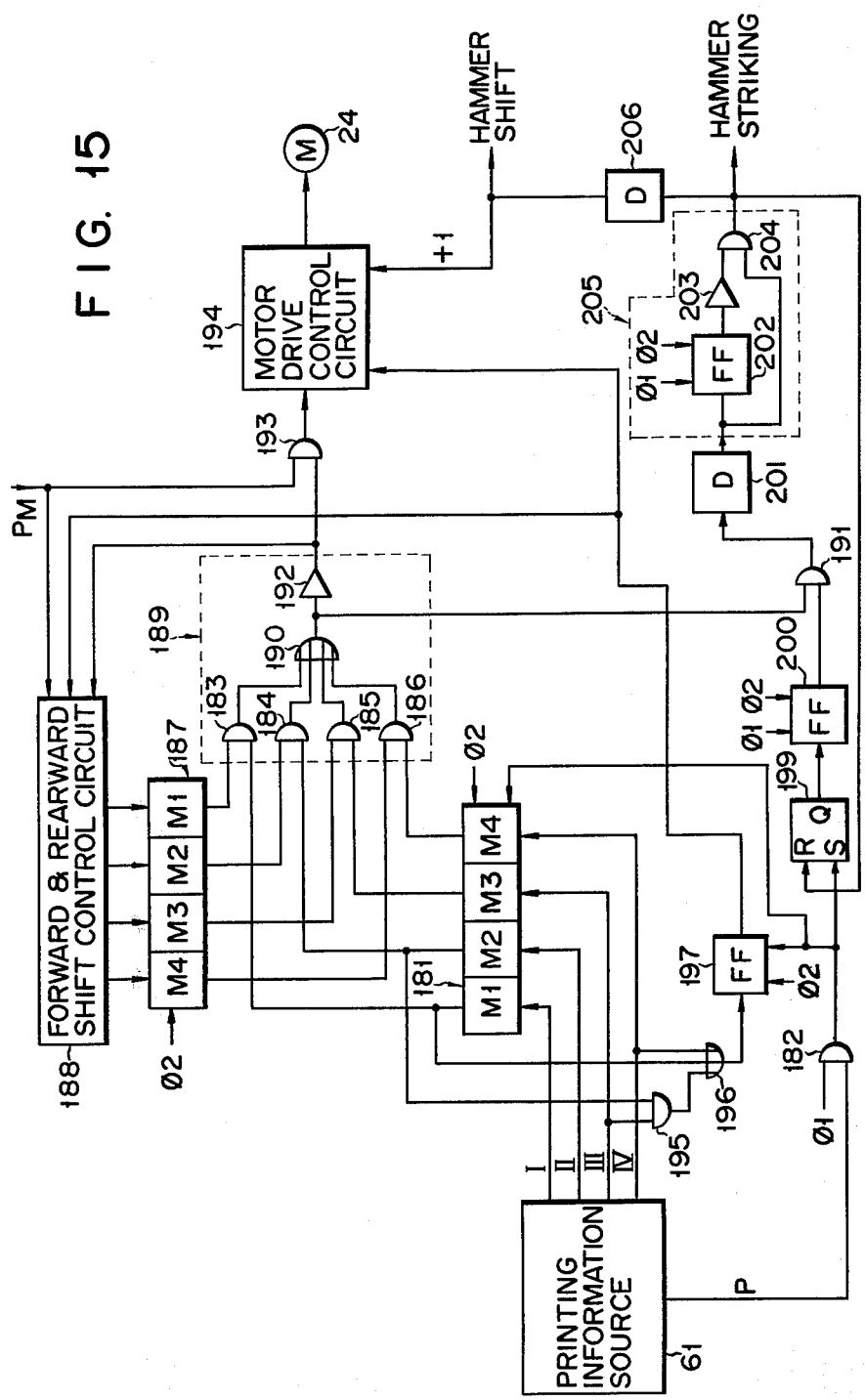
FIG. 15 is another schematic logic circuit diagram of an electronic control circuit for rotating the pulse motor 24 shown in FIG. 1.

A similar character printing operation is repeated each time a new column selection signal I, II, III or IV is generated by the printing information source 61. FIG. 15 illustrates a modified electronic control circuit for rotating the motor 24 in response to the column selection signal I, II, III or IV from the printing information source 61.

A column selection signal I, II, III or IV representative of a column on the drum 11 containing a new character type being printed which is delivered from the printing information source 61 at each printing step is supplied to a memory device 181 comprising four memory elements $M_1$ to $M_4$, such as D-type flip-flops, the memory device 181 being provided if required and having the same construction as the memory device 85 shown in FIG. 7. The memory device 181 stores therein a column selection signal I, II, III or IV fed from the printing information source 61 each time a printing operation in accordance with any of the character types 12 arranged on the drum 11 is effected, under control of the output signal from an AND gate 182 having two input terminals supplied with the printing instruction signal P from the printing information source 61 and the first phase clock pulse $\phi_1$. The column selection signal stored in the memory device 181 is read out therefrom under control of the second phase clock pulse $\phi_2$.

Accordingly, a column selection signal representative of a column on the drum 11 including the last one of the printed character types 12 is continuously generated from the memory device 181 during the time period in which a column selection signal I, II, III or IV representative of a column on the drum 11 containing a new character type being printed is supplied from the printing information source 61 to the memory device 181 and then the second phase clock pulse $\phi_2$ following the first phase clock pulse $\phi_1$ is applied to the memory device 181.

The column selection signal read out from the memory device 181 is applied to one input terminal of the corresponding one of four AND gates 183, 184, 185 and 186.

On the other hand, a shift register 187 comprising four memory elements $M_1$ to $M_4$, such as D-type flip-flops, is provided. The output terminals of the memory elements $M_1$ to $M_4$ are separately connected to the other input terminals of the corresponding AND gates 183 to 186. Hence the shift register 187 previously stores in any of the memory elements $M_1$ to $M_4$, for example, $M_1$ a column selection signal indicative of an initial or original position of the drum 11 before the aforesaid column selection signal is generated from the printing information source 61. Each time a column selection signal representative of a column on the drum 11 containing a character type to be printed is generated from the printing information source 61, this column selection signal is stored in the corresponding one of the memory elements $M_1$ to $M_4$ constituting the memory device 181.

The column selection signal stored in the memory device 181 is read out therefrom under control of the second phase clock pulse $\phi_2$. At this time, the output column selection signal from the shift register 187 is compared by the AND gates 183 to 186 with the output column selection signal from the memory device 181 and the memory position in the shift register 187 is shifted forward or rearward in turn under control of output signals from a forward and rearward shift control circuit 188 having the later described construction, until any of the AND gates 183 to 186 is actuated to deliver a binary 1 signal. Accordingly, the shift register 187 always stores therein a column selection signal representative of a column on the drum 11 containing the last one of the printed character types 12 and functions as a memory device equivalent to the memory device 91 shown in FIG. 9.

In addition, the shift register 187 performs the shift operation as described above under control of the output signal from the forward and rearward shift control circuit 188 each time such a column selection signal is generated from the printing information source 61. A column selection circuit 189 similar in function to the column selection circuit 83 shown in FIG. 5 which is constructed of 16 (4×4) AND gates $A_{11}$ to $A_{44}$ as shown in FIGS. 5 and 7 is constituted by the four AND gates 183 to 186. As a result, 16 (4×4) numeral signals can be produced from the column selection circuit 189 for controlling the axial shift of the drum 11. However, this column selection circuit 189 differs from the column selection circuit 83 in that it is designed to generate therefrom the numerical signals representing only the axial shift distance of the drum 11 without taking into account the shift distance (taken into consideration later) of the hammer 32 at each printing step. Therefore, this column selection circuit 189 produces 16 numerical signals by one less than those from the AND gates $A_{11}$ to $A_{44}$ shown in FIGS. 5 and 7 (for detail see Table III).

Table III

| | | Memory elements in memory device 181 | | | |
|---|---|---|---|---|---|
| | | $M_1$ | $M_2$ | $M_3$ | $M_4$ |
| Memory | $M_1$ | 0 | +1 | +2 | +3 |
| elements | $M_2$ | −1 | 0 | +1 | +2 |
| in shift | $M_3$ | −2 | −1 | 0 | +1 |
| register 187 | $M_4$ | −3 | −2 | −1 | 0 |

The output terminals of the AND gates 183 to 186 in the column selection circuit 189 are connected to the respective input terminals of the OR gate 190. The output terminal of the OR gate 190 is connected to one input terminal of an AND gate 191. An output signal from the OR gate 190 is supplied through an inverter 192 to the shift control circuit 188 as a forward or rearward shift instruction signal and also to one input terminal of an AND gate 193. The AND gate 193 has the other input terminal supplied with the aforesaid step pulse signal PM. The step pulse signal PM is also impressed on the shift control circuit 188 for shifting the memory position in the shift register 187 forward or rearward in synchronism with the rotation of the pulse motor 24. The output signal from the AND gate 193 applied as a step signal to a motor drive control circuit 194 having the same construction as the motor drive control circuit 98 shown in FIG. 9.

On the other hand, those of 16 numerical signals obtained by comparing signals appearing on the output terminals of the memory elements $M_1$ to $M_4$ constituting the shift register 187 with signals appearing on the input terminals of the memory elements $M_1$ to $M_4$ constituting the memory device 181 which represent the minus numeral is supplied through an AND gate 195 aND OR gate 196 to a D-type flip-flop circuit 197. The flip-flop circuit 197 stores therein an output signal from the OR gate 196 under control of the output signal from the AND gate 182.

The signal stored in the flip-flop circuit 197 is read out therefrom under control of the second phase clock pulse $\phi_2$. The output signal from the circuit 197 is applied to the motor drive control circuit 194 as a reverse rotating instruction signal.

In FIG. 15, a hammer striking instruction signal source comprises an R-S flip-flop circuit 199 brought to a set position by the output signal from the AND gate 182; a D-type flip-flop circuit 200 supplied with a Q output signal from the flip-flop circuit 199; and the aforesaid AND gate 191 having two input terminals supplied with an output signal from the flip-flop circuit 200 and an output signal (this signal detects the completion of shift of the memory position in the shift register 187) from the OR gate 190; a delay circuit 201 supplied with an output signal from the AND gate 191; and a one-shot multivibrator 205 supplied with an output signal from the delay circuit 201 and including a D-type flip-flop circuit 202, an invertor 203 and an AND gate 204. The hammer striking instruction signal source has substantially the same construction as that of FIG. 9 and description thereof is omitted. An output signal from the one-shot multivibrator 205 is applied to the R-S flip-flop circuit 199 as a reset signal and also to the hammer 32 as a unit step instruction signal through an inverter 206. An output signal from the delay circuit 206 is impressed on the motor drive control circuit 194 as a +1 step instruction signal.

Figure 16:
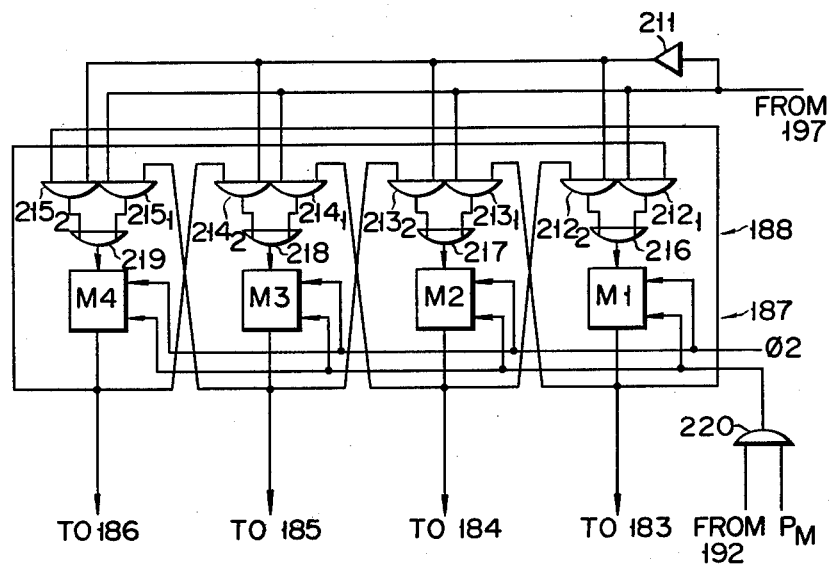
FIG. 16 is a practical arrangement of the forward and rearward shift control circuit shown in FIG. 15.

FIG. 16 is a practical arrangement of the shift control circuit 188 shown in FIG. 15. The shift control circuit 188 has pairs of AND gates $212_1$-$212_2$, $213_1$-$213_2$, $214_1$-$214_2$, and $215_1$-$215_2$ coupled with the memory elements $M_1$ to $M_4$ constituting the shift register 187. One of each pair to or AND gates $212_1$-$212_2$ -$215_1$-$215_2$ each has one input terminal connected directly to the output terminal of said flip-flop circuit 197 and the other has one input terminal connected via an inverter 211 thereto. Each pair of AND gates $212_1$-$212_2$ - or $215_1$-$215_2$ have their output terminals connected to two input terminals of the corresponding OR gates 216 to 219.

The output terminal of each of the OR gates 216 to 219 is connected to the input terminal of the corresponding one of the memory elements $M_1$ to $M_4$ constituting the shift register 187. These memory elements $M_1$ to $M_4$ store therein a forward or rearward shift instruction signal obtained through the corresponding OR gates 216 to 219 under control of an output signal from an AND gate 220. The AND gate 220 has an input terminal supplied with the shift instruction signal obtained through the inverter 192 and another input terminal supplied with the step pulse signal PM.

The signal stored in the shift register 187 is read out therefrom under control of the second phase clock pulse $\phi_2$.

The output terminal of the first state memory element $M_1$ in the shift register 187 is connected to the other input terminal of each of the AND gates $213_1$ and $215_2$. The output terminal of the second stage memory element $M_2$ is connected to the other input terminal of each of the AND gates $214_1$ and $212_2$. The output terminal of the third stage memory element $M_3$ is connected to the other input terminal of each of and AND gates $215_1$ and $213_2$. The output terminal of the fourth or last stage memory element $M_4$ is connected to the other input terminal of each of the AND gates $212_1$ and $214_2$. It will be apparent to those skilled in the art that the memory position in the memory elements $M_1$ to $M_4$ of the shift register 187 can be endlessly shifted in sequence in the forward or rearward direction under control of the output signal from the AND gate 220 and the second phase clock pulse $\phi_2$, depending on the presence or absence of the aforesaid reverse rotating instruction signal fed from the flip-flop circuit 197. The operation of the circuit shown in FIG. 15 will now be described.

When a column selection signal I, II, III or IV representative of a column on the drum 11 containing a character type on the drum 11 to be printed is generated from the printing information source 61, then this signal is stored in the corresponding one of the memory elements $M_1$ to $M_4$ constituting the memory device 181 under control of the output signal from the AND gate 182 having input terminals supplied with the printing instruction signal P and the first clock pulse $\phi_1$.

The column selection signal stored in the memory device 181 is read out therefrom under control of the second phase clock pulse $\phi_2$ and then compared by the column selection circuit 189 with the column selection signal stored in the shift register 187 and representing a column on the drum 11 containing the last character type just printed. When the memory position in the memory device 181 coincides with the memory position in the shift register 187, for example, when two output signals are generated from the respective first memory elements $M_1$, then the coincidence can be detected by the corresponding AND gate 183 in the column selection circuit 189. An output signal from the ANd gate 183 is fed to the inverter 192 through the OR gate 190. Since the output of the inverter 192 at this time is binary 0, the memory position in the shift register 187 remains unchanged without being controlled by the shift control circuit 188. At this time, since a binary 1 signal is not generated from the AND gate 193, it is only natural that the motor drive control circuit 194 is not driven by the output signal from the AND gate 193. When, under this condition, a character printing instruction signal is supplied from the printing information source 61 to the AND gate 191 through the AND gate 182, R-S flip-flop circuit 199, and flip-flop circuit 200, then the AND gate 191 is actuated to deliver a binary signal 1. An output signal from the AND gate 191 is impressed on the exciting coil 49 of the plunger 51 through the delay circuit 201 and one-shot multivibrator 205, whereby the hammer tip 31 strikes the opposed character type of the drum 11 through a record sheet and the R-S flip-flop circuit 199 is reset to be made ready for the next operation. The output signal form the one-shot multivibrator 205 is applied to the pulse motor 24 as a step instruction signal through the delay circuit 206 and also to the motor drive control circuit 194 as a +1 or unit step signal. As a result, the drum 11 is moved by the pulse motor 24 by the unit step distance in the stepping direction of the hammer 32, preparing for the next printing operation.

When that memory position in the memory device 181 which represents a column on the drum 11 containing a character type being printed differs from that memory position in the shift register 187 which represents a column on the drum 11 containing the last one of the printed character types, then all the AND gates 183 to 186 are not qualified in the column selection circuit 189. Therefore, no output signal or a binary 0 signal can be obtained from the OR circuit 190, generating a binary 1 signal from the inverter 192. As a result, the memory position in the shift register 187 is shifted in sequence in the direction determined by the output signal from the flip-flop circuit 197 each time the step pulse signal PM is applied to the shift control circuit 188. When the memory position in the shift register 187 coincides with that in the memory device 181, then the AND operation is applicable in the corresponding one of the AND gates 183 to 186 in the column selection circuit 189, to generate an output signal or a binary 1 signal, whereby the shifting operation of the memory position in the shift register 187 is completed. Whenever a column selection signal I, II, III or IV representing a column on the drum 11 containing a character type to be printed is generated by the printing information source 61, the shift register 187 acts as a memory device storing therein a column selection signal which represents a column on the drum 11 containing the preceding character types just printed. The AND gate 193 is continuously qualified until any one of the AND gates 183 to 186 in the column selection circuit 189 is qualified. The pulse motor 24, while the AND gate 193 is qualified, will rotate step by step in the direction determined by the output signal from the flip-flop circuit 197 obtained through the motor drive control circuit 194 by the angle determined by comparing the column selection signal from the memory device 181 with that from the shift register 187 each time the step pulse signal PM is applied to the AND gate 193, whereby a colum position on the drum 11 containing the desired character type to be opposed to the hammer 32 can be selected. Upon completing the axial shift of the drum 11 to be opposed to the hammer 32, the hammer 32 will be driven by the output signal from the one-shot multivibrator 205 to strike on the opposed character type of the drum 11, whereby the predetermined character printing can be effected on a record sheet.

After the completion of the character type printing, the drum 11 will be shifted in the same direction as, by the same distance as, and in the synchronism with, the hammer 32, being made ready for the next printing operation.

Figure 17:
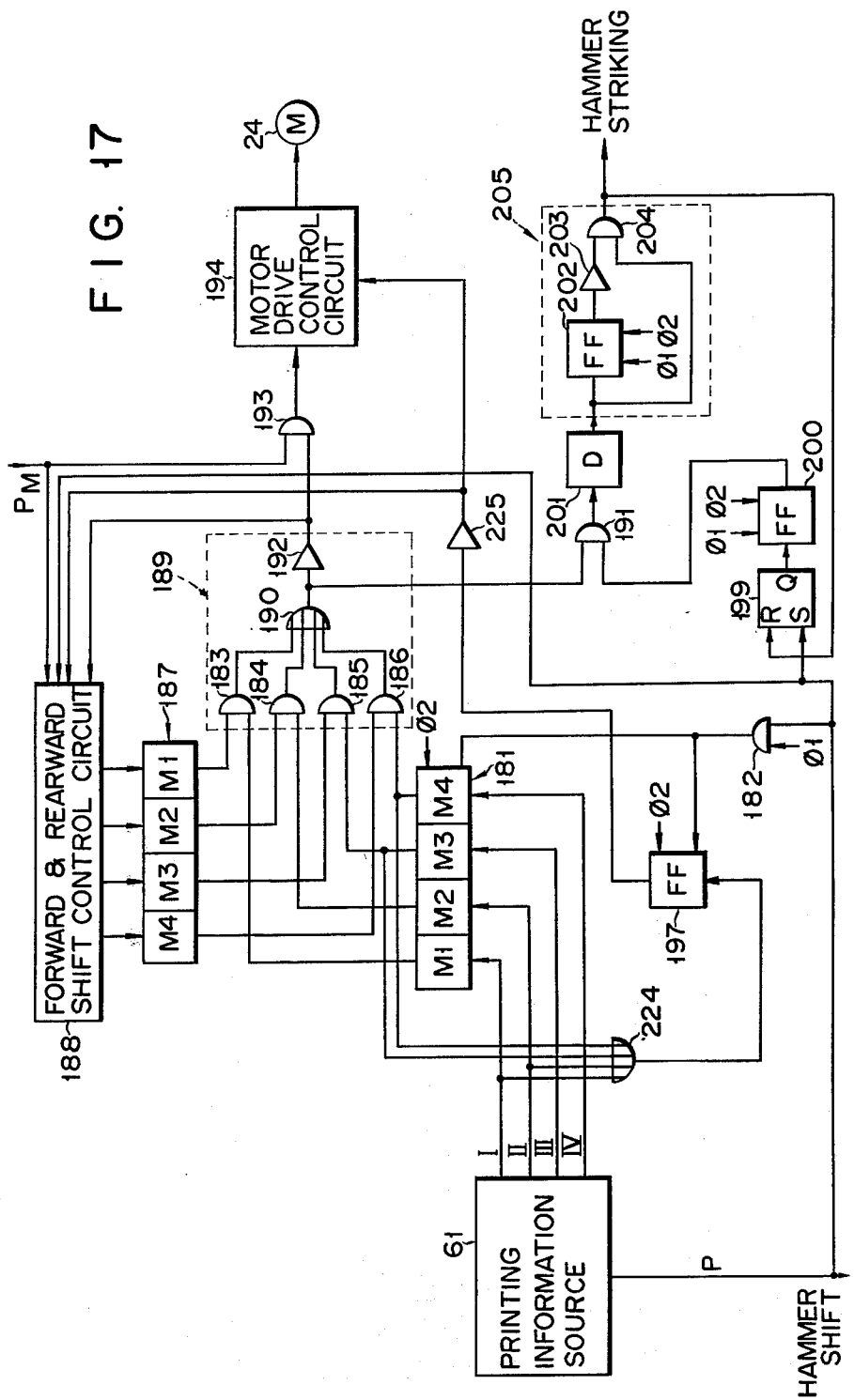
FIG. 17 shows a schematic logic circuit diagram modified from FIG. 15.

FIG. 17 shows a schematic logic circuit diagram of one modification of FIG. 15. The electronic control circuit of FIG. 15 is so constructed that the output signal from the memory device 181 representing a column on the drum 11 containing a character type to be printed the output signal from the AND gates 183 to 186 in the column selection circuit 189 is compared with the output signal from the shi.t register 187 representing a column on the drum 11 containing the preceding character type just printed in such a manner that the shifting direction and distance of the drum 11 along the shaft 13 are determined without taking into account the step-by-step movement of the hammer 32 at each printing step and then the drum 11 is moved in the same direction as, by the same distance as, and in synchronism with, the hammer 32.

On the contrary, the modification of FIG. 17 is so constructed that the AND gates 183 to 186 in the column selection circuit 189 produce the 16 numerical signals equivalent to those from the AND gates $A_{11}$ to $A_{44}$ shown in FIGS. 5 and 7 by beforehand taking the step-by-step movement of the hammer 32 at each printing step into account.

In this case, all the plus ones of 16 (4×4) numeral signals obtainable from the column selection circuit 189 are impressed on the flip-flop circuit 197 through an OR gate 224, as a signal which determines the shifting direction of the memory position in the shift control circuit 188 and the rotating direction of the pulse motor 24 through the motor drive control circuit 194. Thus, an output signal from the flip-flop circuit 197 is applied through an inverter 225 to the shift control circuit 188 and the motor drive control circuit 194.

The hammer 32 is moved by the predetermined unit shift distance along the shaft 36 by a character printing instruction signal P which is produced from the printing information source 61 at each printing step. At the same time, the character printing instruction signal P from the printing information source 61 is also applied to the shift control circuit 188, whereby the memory position in the shift register 187 is previously shifted in the forward direction by one bit in synchronism with the aforesaid hammer shift at each printing step.

Figure 19:
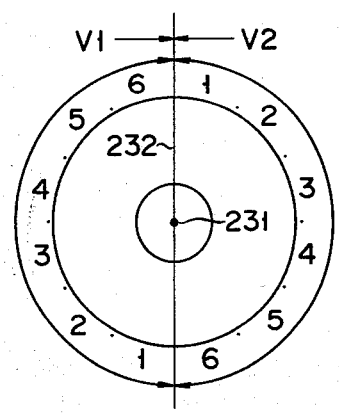
FIG. 19 is a schematic plane view of a printing drum driven by the pulse motor 17.

The circuitry of FIG. 17 differs from that of FIG. 15 in that the shifting operation of the drum 11 along the shaft 13 at each printing step is effected in the same manner as that of FIG. 5, in accordance with the output signal from the AND gate 193. Exactly the same explanation as the circuit of FIG. 15 applies to other parts. FIG. 18 is a schematical logic diagram of an electronic control circuit which is constructed so as to select a row on the drum 11 containing a character type being opposed to the hammer 32 by rotating the drum 11 around the shaft 13 through the pulse motor 17 in accordance with printing signals generated from the printing information source 61 at each printing step. It is assumed that the character types 12 arranged in the matrix (12 rows × 8 columns) form on the drum 11 are divided into two groups V1 and V2 (each group is constructed by six character type rows) by a straight line 232 passing through the center 231 of the drum 11 and the respective six character type rows each constituting the group V1 or V2 are further ranked by numerals 1, 2, 3, 4, 5 and 6, as shown in FIG. 19. In this case, the printing information source 61 is designed to generate at each printing step a group selecting signal V1 or V2 and a rank selecting signal T (1, 2, 3, 4, 5 or 6) for selecting a character type row on the drum 11 being opposed to the hammer 32 at each printing step.

The rank selecting signal T generated by the printing information source 61 at each printing step is supplied to an AND gate 241 together with a character printing instruction signal P generated thereby and has a time width equal to the length of time in which any memory position in a shift register 243 encircles. An output signal from the AND gate 241 is applied via an OR gate 242 to a first memory device 243 constituted by the shift register including six cascaded memory elements $M_1$ to $M_6$ such as D-type flip-flops.

Each of the memory elements $M_1$ to $M_6$ in the first memory device 243 stores therein the rank selecting signal T fed from the OR gate 242 under control of the first phase clock pulse $\phi_1$. The memory position in the first memory device 243 is shifted in sequence from the first stage memory element $M_1$ to the sixth or last stage memory element $M_6$ under control of the second phase clock pulse $\phi_2$. An overflow signal from the first memory device 243 is applied to one input terminal of an AND gate 245 having the other input terminal supplied with the character printing instruction signal P from the printing information source 61 through an inverter 244. An output signal from the AND gate 245 is supplied to the first memory device 243 through the OR gate 242. Therefore, the AND gate 245 is qualified only while no character printing instruction signal P is produced from the printing information source 61. Thus, the first memory device 243 constitutes a ring counter in which memory position is periodically encircled. On the other hand, there is provided a second memory device 246 constructed as a ring counter in the same manner as the first memory device 243, and comprising six memory elements $M_1$ to $M_6$ such as cascaded D-type flip-flops with the output terminal of the last stage memory element $M_6$ coupled to the first stage memory element $M_1$. This second memory device 246 is previously stored with a binary coded signal 1 at a memory position where the initial or original position of the subject character printing device is set, indicating that character type row on the printing drum 11 which faces the hammer 32 before the above-mentioned group and rank selecting signals delivered from the printing information source 61. The second memory device 246 is the one wherein the forward or backward shift is controlled as later described by an output signal supplied from a forward and rearward shift control circuit 247, each time the rank selecting signal T denoting the previously described sequential order of the aforesaid respective digits allotted to each character type row on the drum 11 is delivered from the printing information source 61. An output signal from the first memory device 243 (actually consisting of an input signal delivered from the OR gate 242 for control of time) and an output signal from the second memory device 246 are supplied to the corresponding input terminals of an AND gate 248. An output signal from the AND gate 248 is supplied as a step instruction signal to the motor drive control circuit 63 for the pulse motor 17 through an inverter 249, AND gate 251 and a coincidence detection circuit 250 having the later described arrangement.

On the other hand, the aforesaid group selecting signal V1 or V2 delivered from the input printing information source 61 at each printing step is conducted to the input terminal of the AND gate 252 or 253 together with the printing instruction signal P generated by the printing information source 61 in synchronization with said rank selecting signal T. The second group selecting signal V2 from the AND gate 253 is transmitted to the set terminal of an R-S flip-flop circuit 254, and the first group selecting signal V1 from the AND gate 252 is conducted to the reset terminal of said R-S flip-flop circuit 254. The first group selecting signal V1 from the AND gate 252 is supplied to the reset terminal of said flip-flop circuit 254.

The Q output terminal of the flip-flop circuit 254 is connected to one input terminal of an exclusive OR gate 254 and also to the other input terminal thereof through a delay circuit 256 such as a D-type flip-flop circuit having a delay time corresponding to the pulse width of the printing instruction signal P. An output signal from the exclusive OR gate 255 is supplied to another input terminal of the AND gate 248 through an inverter 257 and also to one input terminal of an exclusive OR gate 258. The other input terminal thereof is supplied with a Q output from an R-S flip-flop circuit 259 brought to a set position by an output signal from the second memory device 246.

The flip-flop circuit 259 is reset by an output signal from an AND gate 261 having an input terminal supplied with an output signal from the first memory device 243 and another input terminal supplied with an output signal from the second memory device 246 through an inverter 260. An output signal from the exclusive OR gate 258 is conducted to a D-type flip-flop circuit 262. The flip-flop circuit 262 stores therein an output signal from the exclusive OR gate 258 under control of an output signal of an AND gate 264 having an input terminal supplied with the printing instruction signal P from the printing information source 61 and another input terminal supplied with an end clock pulse $\phi_e$ as shown in FIG. 21C. The signal stored in the flip-flop circuit 262 is read out therefrom under control of the second phase clock pulse $\phi_2$.

An output signal from the flip-flop circuit 262 is delivered as a shift instruction signal to the shift control circuit 247, and also to the motor drive control circuit 63 as a reverse rotation instruction signal through an inverter 263.

FIG. 20 shows a practical circuit arrangement of the coincidence detection circuit 250 included in FIG. 18. This coincidence detection circuit 250 comprises a shift register 271 formed of five memory elements $M_1$ to $M_5$, for example, cascaded D-type flip-flop circuits; an OR gate 272 whose input terminals are connected to the output terminals of the respective memory elements $M_1$ to $M_5$ of the shift register 271; and a D-type flip-flop circuit 273 supplied with an output signal from the OR gate 272.

An output signal from the inverter 249 is supplied to the first stage memory element $M_1$ of the shift register 271 and also to another input terminal of the OR gate 272. Each of the memory elements $M_1$ to $M_6$ of the shift register 271 writes therein an output signal from the memory element of the preceding stage under control of the first phase clock pulse $\phi_1$ of FIG. 21A and also to draw out the stored signal under control of the second phase clock pulse $\phi_2$ of FIG. 21B.

The flip-flop circuit 273 writes therein an output from the OR gate 272 under control of the first phase clock pulse $\phi_1$ and also to draw out the stored signal under control of an end clock pulse $\phi_e$ of FIG. 21C generated for each encircling period of each of the memory devices 243 and 246.

The operation of the electronic control circuit of FIG. 18 will now be described. This circuit is designed to be so operated as to drive the pulse motor 17 according to the group selecting signal V1 or V2 denoting the lengthwise half section of the drum 11 and rank selecting signal T representative of the positions 1, 2, 3, 4, 5 and 6 sequentially arranged, as shown in Table IV, in the circumferential direction of each lengthwise half section of the drum 11 and occupied by the respective character types 12 thereon.

synchronization with the printing instruction signal P which indicates a row on the drum 11 including a character type being printed is transmitted to the AND gate 248 through the corresponding AND gate 252 or 253, R-S flip-flop circuit 254, exclusive OR gate 255 and inverter 257 in turn.

As the result, the AND gate 248 compares the rank selecting signal T and the group selecting signal V1 or V2 jointly denoting a row on the drum 11 including the last printed character type with the rank selecting signal T and the group selecting signal V1 or V2 collectively representing a row on the drum 11 containing a new character type being printed. Where, as the result of said comparison, coincidence takes place between the past group selecting signal V1 or V2 corresponding to the just printed character type on the drum and the new group selecting signal V1 or V2 corresponding to a new character type on the drum 11 being printed as well as between the past rank selecting signal T and the new rank selecting signal T, then the AND gate 248 gives forth a binary coded signal 1, preventing the inverter 249 from generating a binary 1 signal. In this case, therefore, the pulse motor 17 is not driven by the motor drive control circuit 63 but maintains the printing drum 11 in the same position as that set by said drum 11 one character before. Conversely where the Table IV

|    |   | 1 | 2 | 3 | 4 | 5 | 6 | 1 | 2 | 3 | 4 | 5 | 6 |
|----|---|---|---|---|---|---|---|---|---|---|---|---|---|
| V1 | 1 | 0 | +1 | +2 | +3 | +4 | +5 | ±6 | −5 | −4 | −3 | −2 | −1 |
|    | 2 | −1 | 0 | +1 | +2 | +3 | +4 | +5 | ±6 | −5 | −4 | −3 | −2 |
|    | 3 | −2 | −1 | 0 | +1 | +2 | +3 | +4 | +5 | ±6 | −5 | −4 | −3 |
|    | 4 | −3 | −2 | −1 | 0 | +1 | +2 | +3 | +4 | +5 | ±6 | −5 | −4 |
|    | 5 | −4 | −3 | −2 | −1 | 0 | +1 | +2 | +3 | +4 | +5 | ±6 | −5 |
|    | 6 | −5 | −4 | −3 | −2 | −1 | 0 | +1 | +2 | +3 | +4 | +5 | ±6 |
| V2 | 1 | ±6 | −5 | −4 | −3 | −2 | −1 | 0 | +1 | +2 | +3 | +4 | +5 |
|    | 2 | +5 | ±6 | −5 | −4 | −3 | −2 | −1 | 0 | +1 | +2 | +3 | +4 |
|    | 3 | +4 | +5 | ±6 | −5 | −4 | −3 | −2 | −1 | 0 | +1 | +2 | +3 |
|    | 4 | +3 | +4 | +5 | ±6 | −5 | −4 | −3 | −2 | −1 | 0 | +1 | +2 |
|    | 5 | +2 | +3 | +4 | +5 | ±6 | −5 | −4 | −3 | −2 | −1 | 0 | +1 |
|    | 6 | +1 | +2 | +3 | +4 | +5 | ±6 | −5 | −4 | −3 | −2 | −1 | 0 |
| just printed character | T | 1 | 2 | 3 | 4 | 5 | 6 | 1 | 2 | 3 | 4 | 5 | 6 |
| new character |   |   |   | V1 |   |   |   |   |   | V2 |   |   |   |

Under the condition where the printing information source 61 does not generate any printing signal, the memory position in the first memory device 243 coincides with the memory position in the second memory device 246, preventing the AND gate 251 from producing any output signal. Under such condition therefore the motor drive control circuit 63 does not exert any control over the pulse motor 17. Where the printing information source 61 gives forth in synchronization with the printing instruction signal P the group selecting signal V1 or V2 and the rank selecting signal T, then the rank selecting signal T supplied to the first memory device 243 through the AND gate 241 and OR gate 242 is written in the memory device 243 under control of the first and second clock pulses $\phi_1$, $\phi_2$ and then periodically drawn out from the memory device 243 at a time interval equal to the time width of the printing instruction signal P. The rank selecting signal T denoting any of the positions of 1 to 6 thus drawn out from the first memory device 243 is conducted to the AND gate 248 together with a similar rank selecting signal T denoting that row on the drum 11 which includes the last one of the printed character types.

At this time, the group selecting signal V1 or V2 delivered from the printing information source 61 in aforesaid comparison indicates a difference between the past and new rank selecting signals T and/or between the past and new group selecting signals V1 or V2, then the pulse motor 17 is made to rotate, as later described, in the direction determined by the past and new rank selecting signals T and the past and new group selecting signals V1 or V2 by the angle determined by the past and new rank selecting signals T. Where coincidence takes place between the past and new rank selecting signals T, then one input terminal of the exclusive OR gate 258 is supplied with a binary 0 signal through the exclusive OR gate 255.

Where the new rank selecting signal T drawn out from the first memory device 243 under the above-mentioned condition denotes a position bearing a larger numeral than the past rank selecting signal T obtained from the second memory device 246, then the Q output of the R-S flip-flop circuit 259 delivers a binary 0 signal. The binary 0 signal from the flip-flop circuit 259 is applied to the other input terminal of the exclusive OR gate 258. The binary 0 output signal thus obtained from the exclusive OR gate 258 is conducted to the shift control circuit 247 as a signal instructing the forward shift through the flip-flop circuit 262 and also to the motor drive control circuit 63 as a signal instructing the forward rotation through the inverter 263.

Conversely where the new rank selecting signal T drawn out from the first memory device 243 denotes a position bearing a numeral the same as, or smaller than, the past rank selecting signal T delivered from the second memory device 246, then the R-S flip-flop circuit 259 is first reset by an output signal drawn out from the first memory device 243 and immediately after set by an output signal obtained from the second memory device 246. Accordingly, the exclusive OR gate 258, one input terminal of which is supplied with a binary 0 signal delivered from the exclusive OR gate 255 has the other input terminal supplied with a binary 1 signal, thereby transmitting a signal instructing a backward shift to the shift control circuit 247 through the flip-flop circuit 262. At this time the motor drive control circuit 63 is also supplied with a signal instructing a reverse rotation through the inverter 263.

The angle of rotation of the pulse motor 17 is determined as follows according to a difference between the past and new rank selecting signals T. In the case of said difference, the memory position of the second memory device 246 is progressively shifted one bit after another in the direction specified as described above through the shift control circuit 247, each time the step instruction signal PM is received. Thus the pulse motor 17 makes a stepwise rotation in the direction determined as mentioned above through the motor drive control circuit 63, each time said PM signal is received. Where coincidence occurs between the memory position of the second memory device 246 and that of the first memory device 243, then the AND gate 248 gives forth an output signal, changing a binary coded output signal delivered by the inverter 249 from 1 to 0. When, therefore, said binary coded output signal from the inverter 249 has its level changed from 1 to 0, then the motor drive control circuit 63 is automatically brought to rest with the resultant stop of the pulse motor 17, admitting of the selection of a row on the printing drum 11 containing a character type being opposed to the hammer 32.

Where a new group selecting signal supplied from the printing information source 61 is changed from V1 to V2 or vice versa, then an output signal from the exclusive OR gate 255 retains a level of binary 1 for a period equal to the time width of the printing instruction signal P by the action of the delay circuit 256. This binary 1 signal is supplied to one input terminal of the exclusive OR gate 258 and also to the AND gate 248 as a binary 0 signal through the inverter 257. Where, therefore, the new group selecting signal supplied from the printing information source 61 is changed from V1 to V2 or vice versa, then the pulse motor 17 is rotated, regardless of the memory positions of the first and second memory devices 243 and 246, in a direction and by an angle determined as described above, each time said PM signal is supplied through the AND gate 251 to the motor drive control circuit 63. In this case, however, the shift of the memory position of the second memory device 246 and the rotation of the pulse motor 17 are obviously carried out in the opposite direction to the preceding case, because a signal conducted from the exclusive OR gate 255 to the exclusive OR gate 258 has its binary level changed from 0 to 1.

Where the pulse motor 17 is rotated at each printing step for each selection of a character type row on the printing drum 11 in the manner as described above, then highest possible printing can be effected due to time loss being most minimized.

This invention is not limited to a character printing device arranged as described above, but is of course applicable to the type based on substantially the same technical concept, namely, the type admitting of the separate control of the axial shift of the printing drum at each printing step, the peripheral rotation of the drum, the advance of the hammer and the direction in which it is struck.

What is claimed is:

1. A character printing device comprising a printing drum on the peripheral wall of which a plurality of character types are arranged in the axial direction (row) of the drum and in the circumferential direction (column) thereof; a printing information source for generating printing instruction signals for selectively printing any of said character types on the drum on a record medium; a first driving means for shifting the drum along the axis thereof in accordance with the printing instruction signals from the printing information source to position any character type column on the drum opposite a desired character printing position on the record medium; a second driving means for rotating the drum around the axis thereof in accordance with the printing instruction signals from the printing information source to position any character type row on the drum opposite the desired character printing position on the record medium; a hammer disposed close to the drum and opposed to an outer peripheral wall portion of the drum with the record medium interposed therebetween; a third driving means for shifting the hammer at least step by step in a direction parallel with the axis of the drum to determine a character printing position relative to the record medium; and a striking means for striking with the hammer said opposed peripheral wall portion of the drum through the record medium, the improvement wherein said first driving means comprises:

a first memory means (81, 91, 187) coupled with said printing information source to store that signal of the printing instruction signals from said printing information source which represents a character type column containing the last one of the printed character types on said drum;

a character type column selection means (83, 93, 189) coupled with said first memory means (81, 91, 187) and said printing information source to determine the direction and distance of the axial shift of said drum being moved to face the striking wall surface of said hammer by comparing signals stored in said first memory means (81, 91, 187) with printing instruction signals generated by said printing information source and representing a character type column containing that of the character types on said drum which is going to be printed thereby to provide an output corresponding to said determined direction and distance;

a shift control means (64, 98, 194) coupled with said character type column selection means (83, 93, 189) axially to shift said drum in accordance with the output from said character type column selection means (83, 93, 189);

a plurality of column and row lines provided in accordance with the arrangement of the respective character types on the drum; and means for supplying printing instruction signals generated by said printing information source to said plurality of column and row lines;

said character type column selection menas (83, 93, 189) included in said first driving means comprising: a plurality of AND gates (A11–A44), each having an input terminal connected to a corresponding one of the plural column lines (I to IV) and another input terminal connected to a corresponding one of the output terminals of said first memory means (81), and producing an output signal representing the direction and distance of the axial shift of said drum; and a plurality of OR gates (G1–G4), each having input terminals connected to output terminals of those of said plural AND gates (A11–A44) which produce output signals indicating the same axial shifting distance of the drum and an output terminal coupled with said shift control means.

2. A character printing device as claimed in claim 1, wherein said second driving means comprises:

a second memory means (86) coupled to said printing information source for storing that signal of the printing instruction signals from the printing information source which represents a character type row containing the last one of the printed character types on said drum;

a character type row selection means (87) coupled to said second memory means and to said printing information source and being operative to determine the direction and angular displacement of rotation of said drum being moved to face the striking wall surface of said hammer by comparing signals stored in said second memory means (86) with printing instruction signals generated by said printing information source and representing a character type row containing that of the character types on said drum which is going to be printed, and to provide an output corresponding to said direction and angular displacement determined thereby; and a rotation control means (64) coupled to said character type row selection means (87) and being operative to rotate said drum in accordance with the output from said character type row selection means (87).

3. A character printing device comprising a printing drum on the peripheral wall of which a plurality of character types are arranged in the axial direction of the drum and in the circumferential direction thereof; a printing information source for generating printing instruction signals for selectively printing any of said character types on the drum on a record medium; a first driving means for shifting the drum along the axis thereof in accordance with the printing instruction signals from the printing information source to position any character type column on the drum opposite a desired character printing position on the record medium; a second driving means for rotating the drum around the axis thereof in accordance with the printing instruction signals from the printing information source to position any character type row on the drum opposite the desired character printing position on the record medium; a hammer disposed close to the drum and opposed to an outer peripheral wall portion of the drum with the record medium interposed therebetween; a third driving means for shifting the hammer at least step by step in a direction parallel with the axis of the drum to determine a character printing position relative to the record medium; and a striking means for striking with the hammer said opposed peripheral wall portion of the drum through the record medium, the improvement wherein said first driving means comprises:

a first memory means (81, 91, 187) coupled with said printing information source to store that signal of the printing instruction signals from said printing information source which represents a character type column containing the last one of the printed character types on said drum;

a character type column selection means (83, 93, 189) coupled with said first memory means (81, 91, 187) and said printing information source to determine the direction and distance of the axial shift of said drum being moved to face the striking wall surface of said hammer by comparing signals stored in said first memory means (81, 91, 187) with printing instruction signals generated by said printing information source and representing a character type column containing that of the character types on said drum which is going to be printed thereby to provide an output corresponding to said determined direction and distance;

a shift control means (64, 98, 194) coupled with said character type column selection means (83, 93, 189) axially to shift said drum in accordance with the output from said character type column selection menas (83, 93, 189);

a plurality of column and row lines provided in accordance with the arrangement of the respective character types on the drum;

means for supplying printing instruction signals generated by said printing information source to said plurality of column and row lines; and said first driving means including means for stepwise shifting said drum;

said character type column selection means (83, 93, 189) included in said first driving means comprising: a plurality of AND gates (A11–A44), each having an input terminal connected to a corresponding one of the plural column lines (I to IV) and another input terminal connected to a corresponding one of the output terminals of said first memory means (91), and producing an output signal representing the direction and distance of the axial shifting of said drum; a first OR gate (96) having input terminals connected to the output terminals of those of the plural AND gates (A11–A44) which produce output signals instructing said drum to be axially shifted in a direction the same as or reverse to that of said hammer; a plurality of second OR gates, each having input terminals connected to the output terminals of those of the plural AND gates (A11–A44) which produce output signals instructing said drum to be axially shifted in the same direction; and a down counter (95) coupled with said second OR gates to count down the number of axial stepwise shifts of said drum represented by output signals from said second OR gates under control of clock pulses until said number is reduced to zero, said shift control means (98) being coupled with said first OR gate (96) and down counter (95) axially to shift said drum in the direction indicated by the output signal of said first OR gate (96) for a distance indicated by the counts of said down counter (95).

ing information source and representing a character type row containing that of the character types on said drum which is going to be printed, and to provide an output corresponding to said direction and angular displacement determined thereby; and a rotation control means (64) coupled to said character type row selection means (87) and being operative to rotate said drum in accordance with the output from said character type row selection means (87).

* * * * *